(12) United States Patent
Niedzwiecki et al.

(10) Patent No.: US 7,883,793 B2
(45) Date of Patent: Feb. 8, 2011

(54) BATTERY MODULE HAVING BATTERY CELL ASSEMBLIES WITH ALIGNMENT-COUPLING FEATURES

(75) Inventors: Mark Niedzwiecki, Troy, MI (US); Heekook Yang, Ontario (CA); Igor Isayev, Berkley, MI (US)

(73) Assignee: LG Chem, Ltd. (KR)

( * ) Notice: Subject to any disclaimer, the term of this patent is extended or adjusted under 35 U.S.C. 154(b) by 55 days.

(21) Appl. No.: 12/164,741

(22) Filed: Jun. 30, 2008

(65) Prior Publication Data

US 2009/0325059 A1 Dec. 31, 2009

(51) Int. Cl.
*H01M 6/42* (2006.01)
*H01M 10/50* (2006.01)

(52) U.S. Cl. .................. 429/120; 429/151; 429/152; 429/157; 429/159

(58) Field of Classification Search ............... 429/1, 429/120, 151, 152, 153, 154, 155, 157, 159
See application file for complete search history.

(56) References Cited

U.S. PATENT DOCUMENTS

| | | |
|---|---|---|
| 2,273,244 A | 2/1942 | Ambruster |
| 3,503,558 A | 3/1970 | Galiulo et al. |
| 3,522,100 A | 7/1970 | Lindstrom |
| 4,390,841 A | 6/1983 | Martin et al. |
| 5,071,652 A | 12/1991 | Jones et al. |
| 5,270,131 A | 12/1993 | Diethelm et al. |
| 5,346,786 A * | 9/1994 | Hodgetts ............ 429/159 |
| 5,354,630 A | 10/1994 | Earl et al. |
| 5,385,793 A | 1/1995 | Tiedemann et al. |
| 5,487,958 A | 1/1996 | Tura |
| 5,510,203 A * | 4/1996 | Hamada et al. ......... 429/151 X |
| 5,520,976 A | 5/1996 | Giannetti et al. |
| 5,561,005 A | 10/1996 | Omaru et al. |
| 5,606,242 A | 2/1997 | Hull et al. |
| 5,652,502 A | 7/1997 | Van Phuoc et al. |
| 5,658,682 A | 8/1997 | Usuda et al. |

(Continued)

FOREIGN PATENT DOCUMENTS

CN  1512518 A  7/2004

(Continued)

OTHER PUBLICATIONS

U.S. Appl. No. 12/164,627, filed Jun. 30, 2008 entitled Battery Module Having Cooling Manifold and Method for Cooling Battery Module.

(Continued)

*Primary Examiner*—Stephen J. Kalafut
(74) *Attorney, Agent, or Firm*—Cantor Colburn LLP

(57) ABSTRACT

A battery module having battery cell assemblies with alignment-coupling features is provided. The battery module includes a first battery cell assembly having at least first, second, third and fourth alignment-coupling features thereon. The battery module further includes a second battery cell assembly having at least fifth, sixth, seventh, and eighth alignment-coupling features thereon. The fifth, sixth, seventh, and eighth alignment-coupling features of the second battery cell assembly are configured to engage the first, second, third and fourth alignment-coupling features, respectively, of the first battery cell assembly to couple the second battery cell assembly to the first battery cell assembly and to align the second battery cell assembly relative to the first battery cell assembly.

6 Claims, 36 Drawing Sheets

U.S. PATENT DOCUMENTS

| | | | |
|---|---|---|---|
| 5,663,007 A * | 9/1997 | Ikoma et al. | 429/151 X |
| 5,693,432 A | 12/1997 | Matsumoto | |
| 5,756,227 A | 5/1998 | Suzuki et al. | |
| 5,796,239 A | 8/1998 | Van Phuoc et al. | |
| 5,825,155 A | 10/1998 | Ito et al. | |
| 5,982,403 A | 11/1999 | Inagaki | |
| 6,016,047 A | 1/2000 | Notten et al. | |
| 6,099,986 A | 8/2000 | Gauthier et al. | |
| 6,117,584 A | 9/2000 | Hoffman et al. | |
| 6,121,752 A | 9/2000 | Kitahara et al. | |
| 6,257,328 B1 | 7/2001 | Fujiwara et al. | |
| 6,353,815 B1 | 3/2002 | Vilim et al. | |
| 6,362,598 B2 | 3/2002 | Laig-Horstebrock et al. | |
| 6,413,678 B1 | 7/2002 | Hamamoto et al. | |
| 6,422,027 B1 | 7/2002 | Coates, Jr. et al. | |
| 6,441,586 B1 | 8/2002 | Tate, Jr. et al. | |
| 6,448,741 B1 | 9/2002 | Inui et al. | |
| 6,462,949 B1 | 10/2002 | Parish, IV et al. | |
| 6,515,454 B2 | 2/2003 | Schoch | |
| 6,534,954 B1 | 3/2003 | Plett | |
| 6,563,318 B2 | 5/2003 | Kawakami et al. | |
| 6,709,783 B2 | 3/2004 | Ogata et al. | |
| 6,724,172 B2 | 4/2004 | Koo | |
| 6,771,502 B2 | 8/2004 | Getz, Jr. et al. | |
| 6,780,538 B2 * | 8/2004 | Hamada et al. | 429/157 |
| 6,821,671 B2 | 11/2004 | Hinton et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,886,249 B2 | 5/2005 | Smalc | |
| 6,892,148 B2 | 5/2005 | Barsoukov et al. | |
| 6,927,554 B2 | 8/2005 | Tate, Jr. et al. | |
| 6,943,528 B2 | 9/2005 | Scoch | |
| 6,967,466 B2 | 11/2005 | Koch | |
| 6,982,131 B1 * | 1/2006 | Hamada et al. | 429/151 X |
| 7,012,434 B2 | 3/2006 | Koch | |
| 7,026,073 B2 | 4/2006 | Ueda et al. | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,147,045 B2 | 12/2006 | Quisenberry et al. | |
| 7,197,487 B2 | 3/2007 | Hansen et al. | |
| 7,199,557 B2 | 4/2007 | Anbuky et al. | |
| 7,229,327 B2 | 6/2007 | Zhao et al. | |
| 7,250,741 B2 | 7/2007 | Koo et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,315,789 B2 | 1/2008 | Plett | |
| 7,321,220 B2 | 1/2008 | Plett | |
| 7,327,147 B2 | 2/2008 | Koch | |
| 7,479,758 B2 | 1/2009 | Moon | |
| 2003/0184307 A1 | 10/2003 | Kozlowski et al. | |
| 2005/0026014 A1 | 2/2005 | Fogaing et al. | |
| 2005/0100786 A1 | 5/2005 | Ryu et al. | |
| 2005/0127874 A1 | 6/2005 | Lim et al. | |
| 2005/0134038 A1 | 6/2005 | Walsh | |
| 2005/0194936 A1 | 9/2005 | Cho | |
| 2006/0097698 A1 | 5/2006 | Plett | |
| 2006/0100833 A1 | 5/2006 | Plett | |
| 2006/0111854 A1 | 5/2006 | Plett | |
| 2006/0111870 A1 | 5/2006 | Plett | |
| 2007/0035307 A1 | 2/2007 | Scoch | |
| 2007/0037051 A1 * | 2/2007 | Kim et al. | 429/151 |
| 2007/0046292 A1 | 3/2007 | Plett | |
| 2007/0103120 A1 | 5/2007 | Plett | |
| 2007/0120533 A1 | 5/2007 | Plett | |
| 2007/0126396 A1 | 6/2007 | Yang | |
| 2007/0188143 A1 | 8/2007 | Plett | |
| 2007/0236182 A1 | 10/2007 | Plett | |
| 2008/0094035 A1 | 4/2008 | Plett | |
| 2009/0325055 A1 | 12/2009 | Koetting et al. | |
| 2009/0325059 A1 | 12/2009 | Niedzwiecki et al. | |

FOREIGN PATENT DOCUMENTS

| | | |
|---|---|---|
| EP | 0736226 B1 | 3/1999 |
| EP | 0673553 B1 | 2/2001 |
| EP | 1435675 A1 | 7/2004 |
| JP | 4056079 A | 2/1992 |
| JP | 8138735 | 5/1996 |
| JP | 8222280 A | 8/1996 |
| JP | 9129213 A | 5/1997 |
| JP | 09-219213 | 8/1997 |
| JP | 10199510 A | 7/1998 |
| JP | 11066949 A | 3/1999 |
| JP | 11191432 A | 7/1999 |
| JP | 2003219572 A | 7/2003 |
| JP | 2005-126315 | 5/2005 |
| JP | 2008-080995 | 4/2008 |
| KR | 100765659 B1 | 10/2007 |
| KR | 100889241 B1 | 3/2009 |
| KR | 100921346 B1 | 10/2009 |

OTHER PUBLICATIONS

U.S. Appl. No. 12/164,780, filed Jun. 30, 2008 entitled Battery Module Having Battery Cell Assembly With Heat Exchanger.

U.S. Appl. No. 12/165,100, filed Jun. 30, 2008 entitled Battery Cell Assembly Having Heat Exchanger with Serpentine Flow Path.

U.S. Appl. No. 12/016,630, filed Jan. 18, 2008 entitled Battery Cell Assembly and Method for Assembling the Battery Cell Assembly.

U.S. Appl. No. 12/164,445, filed Jun. 30, 2008 entitled Battery Module Having a Rubber Cooling Manifold.

U.S. Appl. No. 11/828,927, filed Jul. 26, 2007 entitled Battery Cell Carrier Assembly Having a Battery Cell Carrier for Holding a Battery Cell Therein.

Chinese Office Action dated Dec. 7, 2007 for Chinese Patent Application No. 200480025941.5 (PCT/KR2004/002399).

European Supplementary Search Report dated Aug. 28, 2009 for EP Application No. 04774658.

International Search Report for PCT/KR2009/000258 dated Aug. 28, 2009.

International Search report for PCT/KR2009/003434 dated Jan. 18, 2010.

Machine translation of JP 08-138735. (doc date May 31, 1996).

Machine translation of JP 10-199510. (doc date Jul. 31, 1998).

Machine translation of JP 2000 260469. (doc date Sep. 22, 2000).

U.S. Appl. No. 12/246,073 filed Oct. 6, 2008 entitled Battery Cell Assembly and Method for Assembling the Battery Cell Assembly.

U.S. Appl. No. 12/426,795 filed Apr. 20, 2009 entitled Frame Member, Frame Assembly and Battery Cell Assembly Made Therefrom and Methods of Making the Same.

U.S. Appl. No. 12/433,155 filed Apr. 30, 2009 entitled Cooling System for a Battery System and a Method for Cooling the Battery System.

U.S. Appl. No. 12/433,397 filed Apr. 30, 2009 entitled Battery Systems, Battery Modules, and Method for Cooling a Battery Module.

U.S. Appl. No. 12/433,427 filed Apr. 30 ,2009 entitled Cooling Manifold and Method for Manufacturing the Cooling Manifold.

U.S. Appl. No. 12/433,485 filed Apr. 30, 2009 entitled Battery Systems, Battery Module, and Method for Cooling the Battery Module.

U.S. Appl. No. 12/433,534 filed Apr. 30, 2009 entitled Battery Systems, Battery Modules, and Method for Cooling a Battery Module.

U.S. Appl. No. 12/511,530 filed Jul. 29, 2009 entitled Battery Module and Method for Cooling the Battery Module.

U.S. Appl. No. 12/511,552 filed Jul. 29, 2009 entitled Battery Module and Method for Cooling the Battery Module.

U.S. Appl. No. 12/549,766 filed Aug. 28, 2009 entitled Battery Module and Method for Cooling the Battery Module.

* cited by examiner

US 7,883,793 B2

BATTERY MODULE HAVING BATTERY CELL ASSEMBLIES WITH ALIGNMENT-COUPLING FEATURES

TECHNICAL FIELD

This application relates generally to a battery module having battery cell assemblies with alignment-coupling features.

BACKGROUND OF THE INVENTION

Battery packs generally have a plurality of battery cells. However, during manufacture, aligning the battery cells in a housing is relatively difficult and time consuming.

Accordingly, the inventors herein have recognized a need for an improved battery module that can minimize and/or eliminate the above-mentioned deficiency.

SUMMARY OF THE INVENTION

A battery module in accordance with an exemplary embodiment is provided. The battery module includes a first battery cell assembly having at least first, second, third and fourth alignment-coupling features thereon. The battery module further includes a second battery cell assembly having at least fifth, sixth, seventh, and eighth alignment-coupling features thereon. The fifth, sixth, seventh, and eighth alignment-coupling features of the second battery cell assembly are configured to engage the first, second, third and fourth alignment-coupling features, respectively, of the first battery cell assembly to couple the second battery cell assembly to the first battery cell assembly and to align the second battery cell assembly relative to the first battery cell assembly.

DETAILED DESCRIPTION OF AN EXEMPLARY EMBODIMENT

Figure 1:
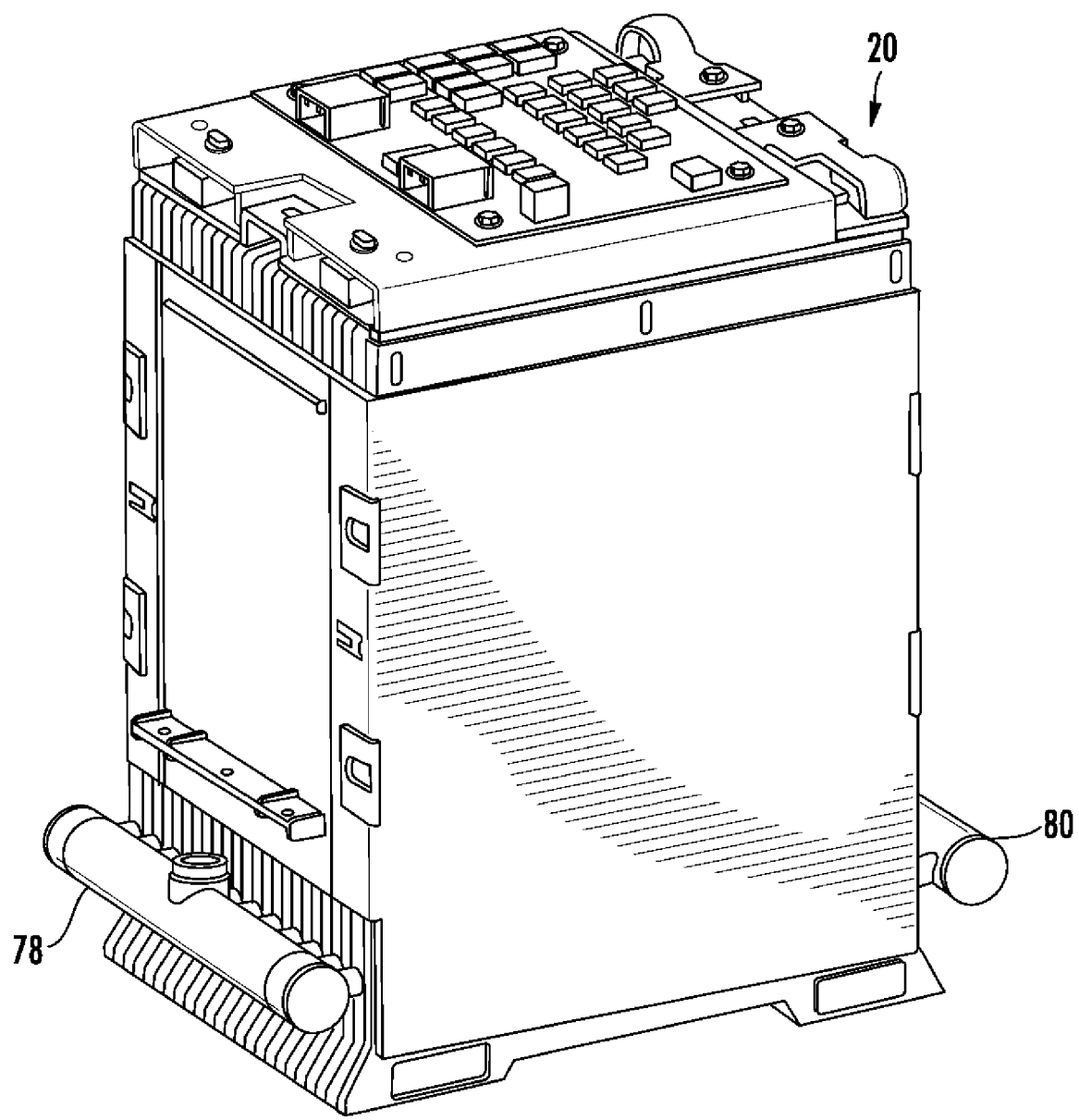
FIG. 1 is a schematic of a battery module in accordance with an exemplary embodiment.
Figure 2:
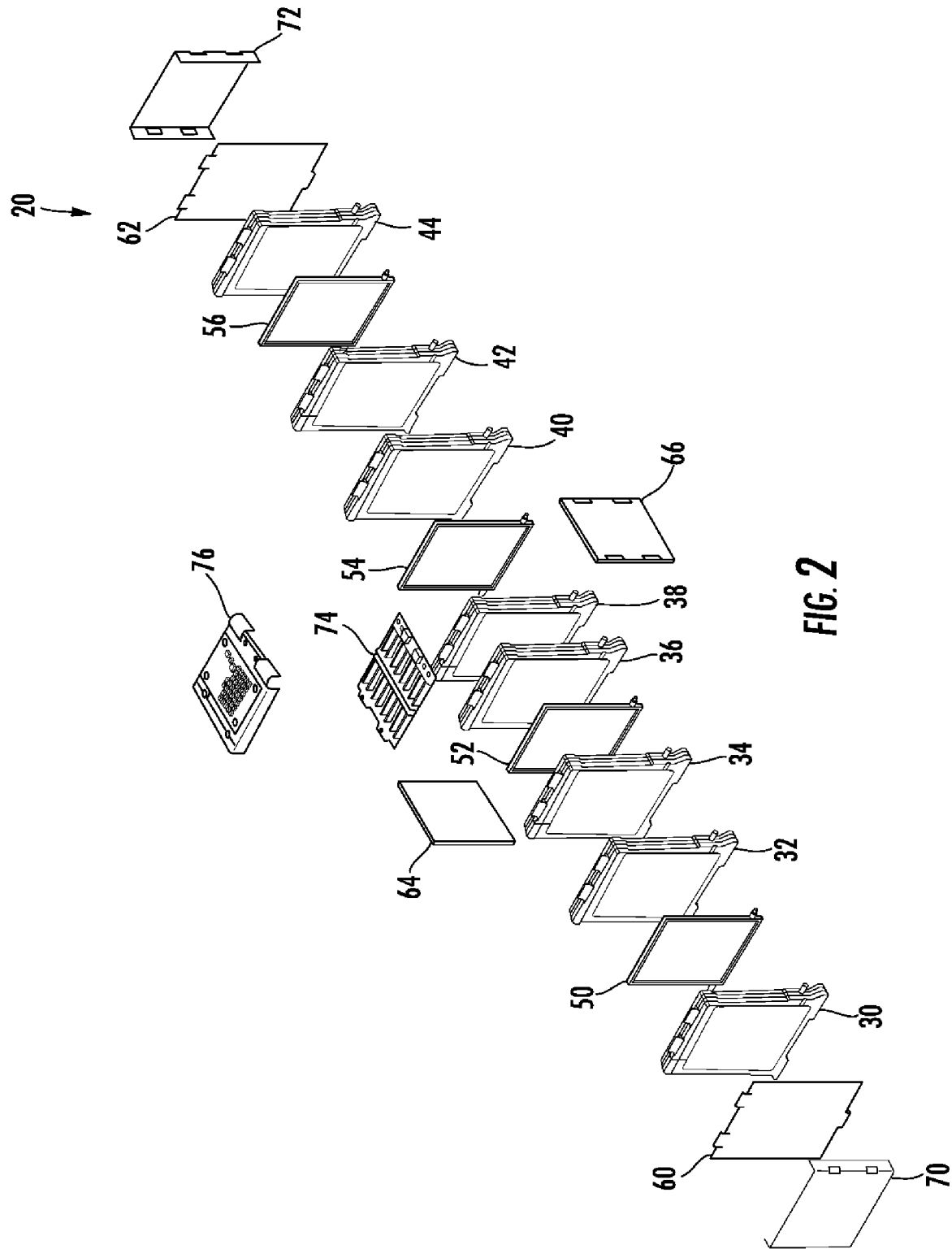
FIG. 2 is an exploded schematic of a portion of the battery module of FIG. 1.

Referring to FIGS. 1 and 2, a battery module 20 for providing electrical power is provided. The battery module 20 includes battery cell assemblies 30, 32, 34, 36, 38, 40, 42, 44, heat exchangers 50, 52, 54, 56, side plates 60, 62, 64, 66, coupling plates 70, 72, an interconnect assembly 74, a cover 76, and cooling manifolds 78, 80. A battery cell assembly is defined as a housing having a battery cell therein. A battery module is defined as at least two battery cell assemblies coupled together.

The battery cell assemblies 30, 32, 34, 36, 38, 40, 42, 44 are electrically coupled together utilizing the interconnect assembly 74. In particular, the interconnect assembly 74 electrically couples together electrical terminals from the battery cell assemblies in a desired configuration to provide an electrical current and voltage therefrom.

The heat exchangers 50, 52, 54, 56 receive a fluid from the cooling manifold 78 to cool the battery cell assemblies. The heated fluid from the heat exchangers 50, 52, 54, 56 is received by the cooling manifold 80.

The side plates 60, 62, 64, 66 are coupled to the battery cell assemblies to provide additional support for the battery cell assemblies. The coupling plates 70, 72 are provided to engage the side plates 64, 66 to provide additional support for the battery cell assemblies. The cover plate 76 is provided to cover the interconnect assembly 74.

Referring to FIGS. 3, 4, 5, 6 and 7, a battery cell assembly 32 in accordance with an exemplary embodiment that is utilized in the battery module 20 will be explained. The battery cell assembly 32 includes a rectangular ring-shaped frame member 90, a battery cell 92, a securement ring-shaped member 94, a battery cell 96, a rectangular ring-shaped frame member 98, a heat exchanger 100, a securement ring-shaped member 102, a battery cell 104, and a rectangular ring-shaped frame member 106. An advantage of the battery cell assembly 32 is that the assembly 32 is packaged such that a single heat exchanger 100 can cool the battery cells 92, 96, 104 to maintain the battery cells at a desired temperature. Further, the rectangular ring-shaped frame members 90, 98, 106 have alignment-coupling features for easily coupling the frame members 90, 98, 106 together while preventing incorrect alignment and placement of the frame members 90, 98, 106 relative to one another.

Referring to FIGS. 3, 8, 9, 10 and 11, the rectangular ring-shaped frame member 90 is configured to be coupled to the rectangular ring-shaped frame member 98 for holding the battery cell 92, the securement ring-shaped member 94, and the battery cell 96 therebetween. The rectangular ring-shaped frame member 90 includes a side 110 and an opposite side 112. Further, in an exemplary embodiment, the frame member 90 includes side walls 114, 116, a lower wall 118, and an upper wall 120. The side walls 114, 116 are disposed apart from one another and are substantially parallel to one another. The lower wall 118 extends between the side walls 114, 116. Further, the upper wall 120 extends between the side walls 114, 116. The side walls 114, 116, the lower wall 118, and the upper wall 120 define an open region 122 therebetween.

Referring to FIGS. 3, 8, 9 and 10, the features of the rectangular ring-shaped frame member 90 on the side 110 will now be discussed. The lower wall 118 includes alignment-coupling features 130, 132 disposed on opposite ends of the lower wall 118. Further, the upper wall 120 includes alignment-coupling features 134, 136 disposed on opposite ends of the upper wall 120. The alignment-coupling features 130, 132, 134, 136 are configured to couple and align with specific alignment-coupling features on the battery cell assembly 30 shown in FIG. 2. Further, the side walls 114, 116, the lower wall 118, and the upper wall 120 define a ledge portion 139. Further, the side walls 114, 116, have horizontal grooves 137, 138 for receiving a portion of an inlet port and an outlet port, respectively, of the heat exchanger 50 thereon shown in FIG. 2.

Figure 18:
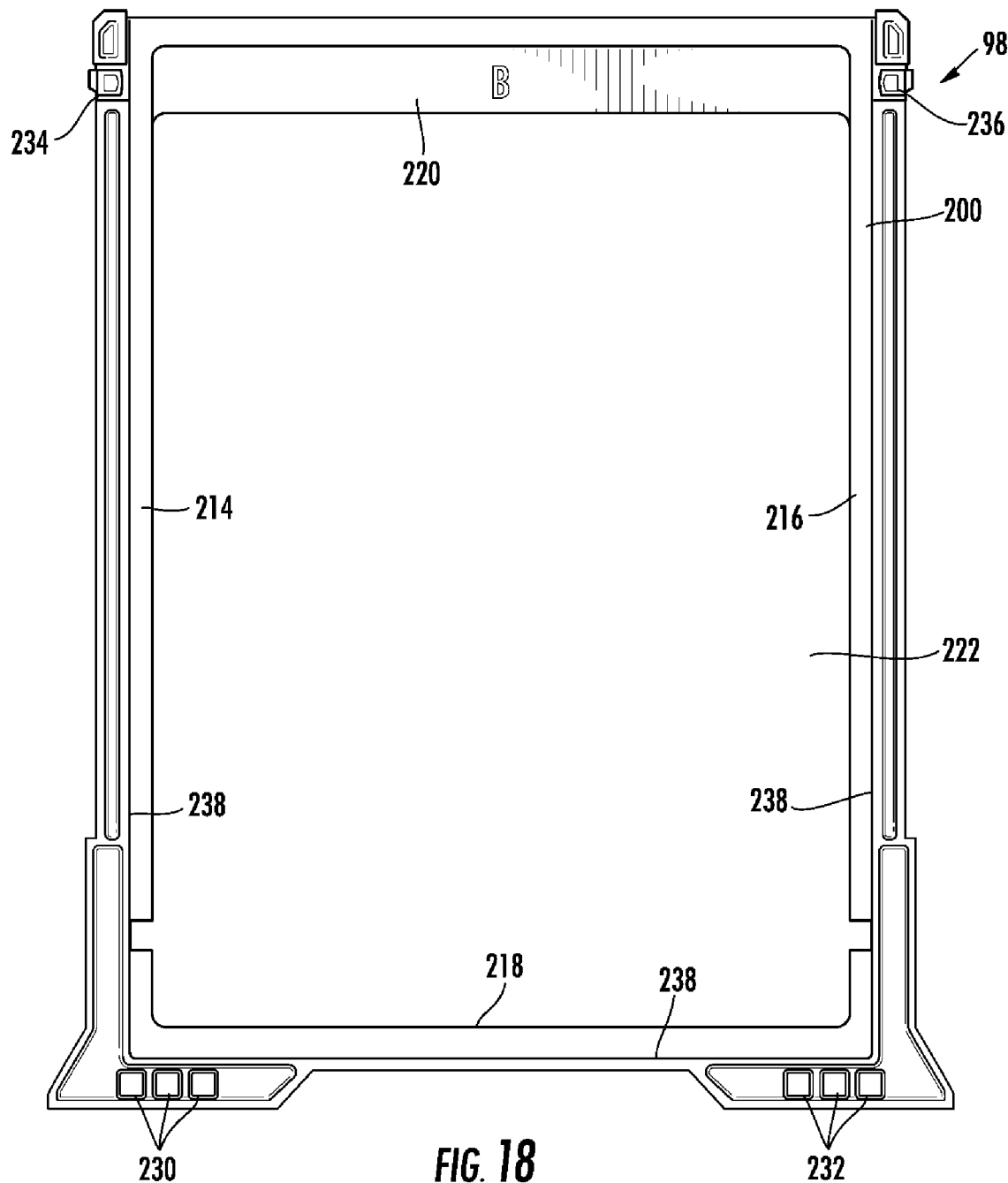
FIG. 18 is a schematic of a first side of a second rectangular ring-shaped frame member utilized in the battery cell assembly of FIG. 3.
Figure 19:
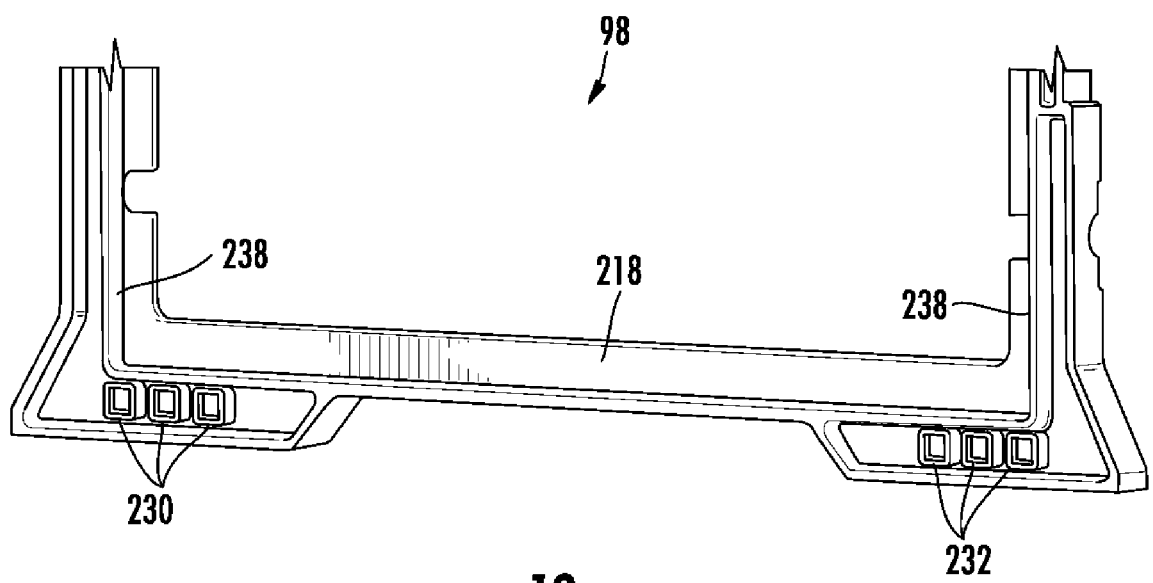
FIG. 19 is a schematic of a bottom portion of the first side of the second rectangular ring-shaped frame member of FIG. 18.
Figure 20:
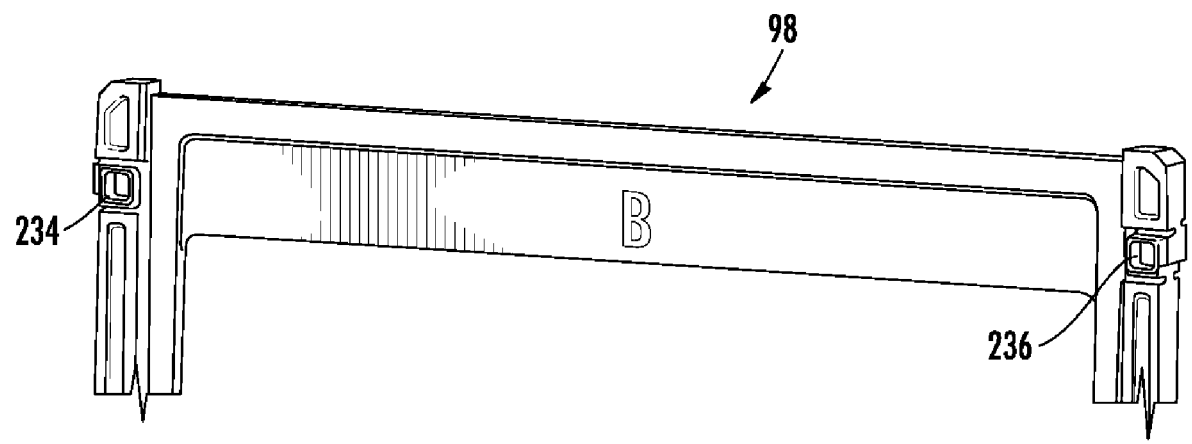
FIG. 20 is a schematic of a top portion of the first side of the second rectangular ring-shaped frame member of FIG. 18.
Figure 21:
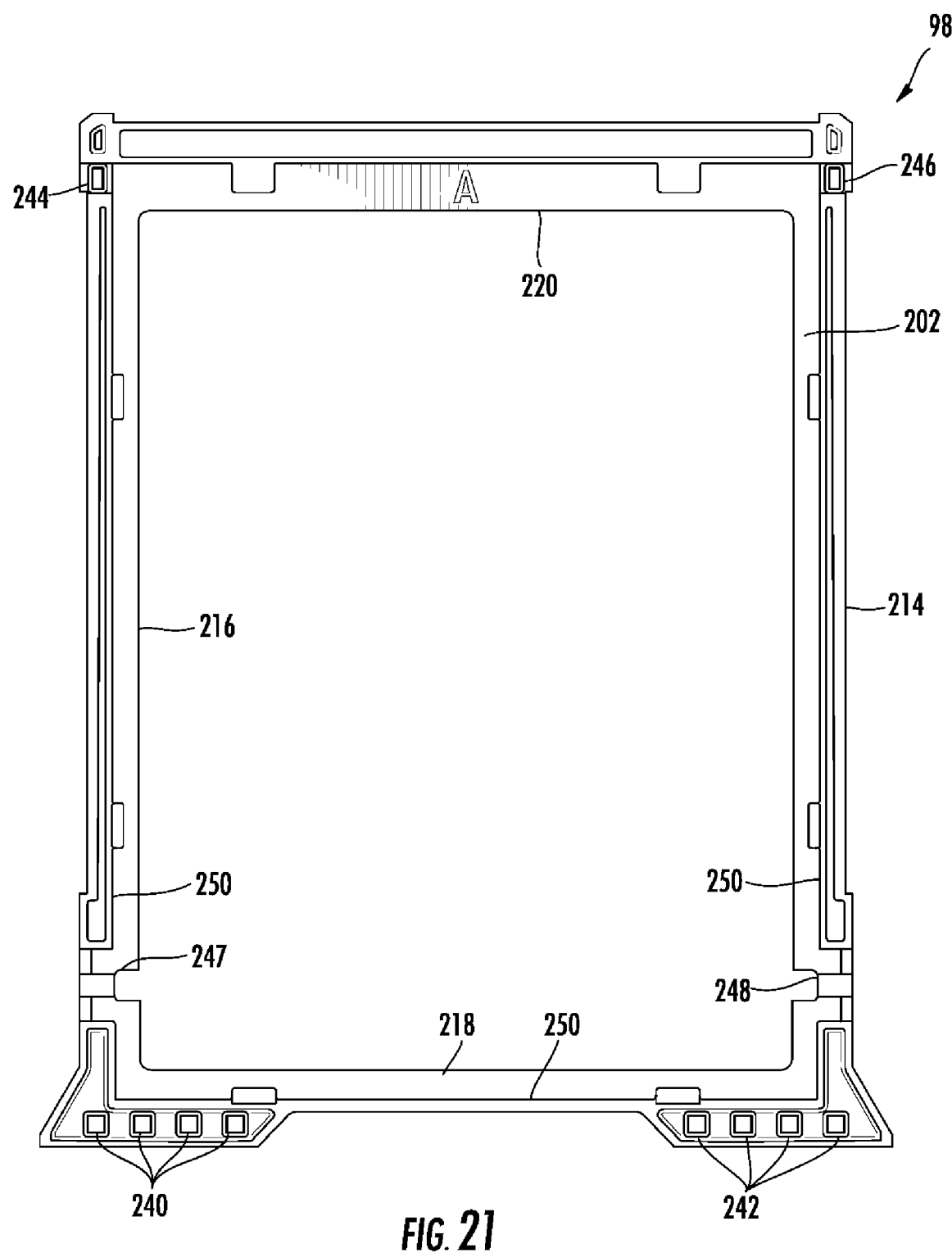
FIG. 21 is a schematic of a second side of the second rectangular ring-shaped frame member of FIG. 18.
Figure 22:
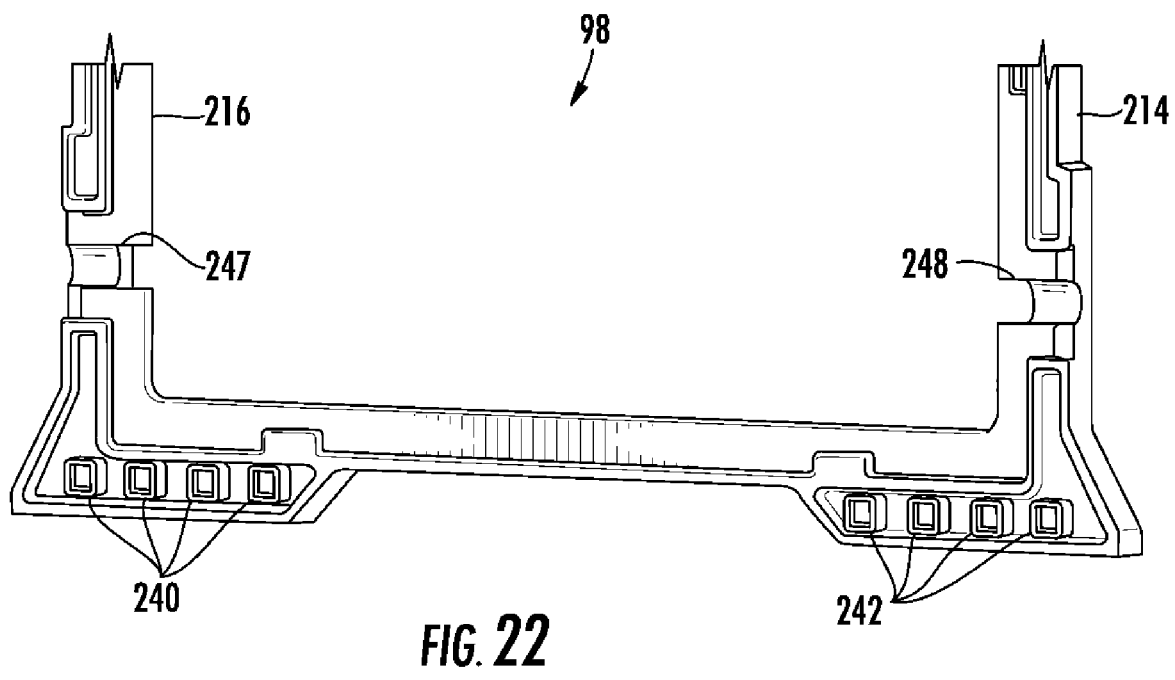
FIG. 22 is a schematic of a bottom portion of the second side of the second rectangular ring-shaped frame member of FIG. 21.
Figure 23:
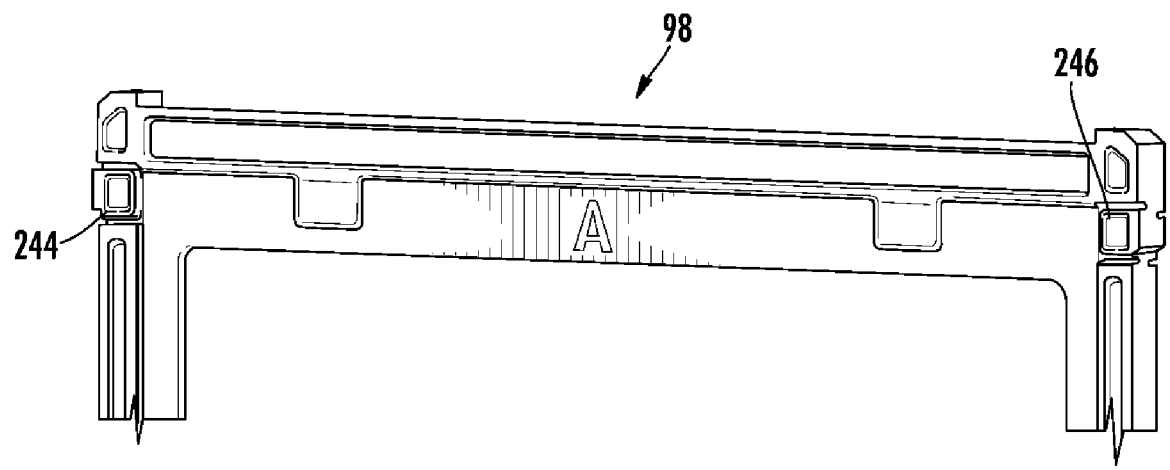
FIG. 23 is a schematic of a top portion of the second side of the second rectangular ring-shaped frame member of FIG. 21.
Figure 24:
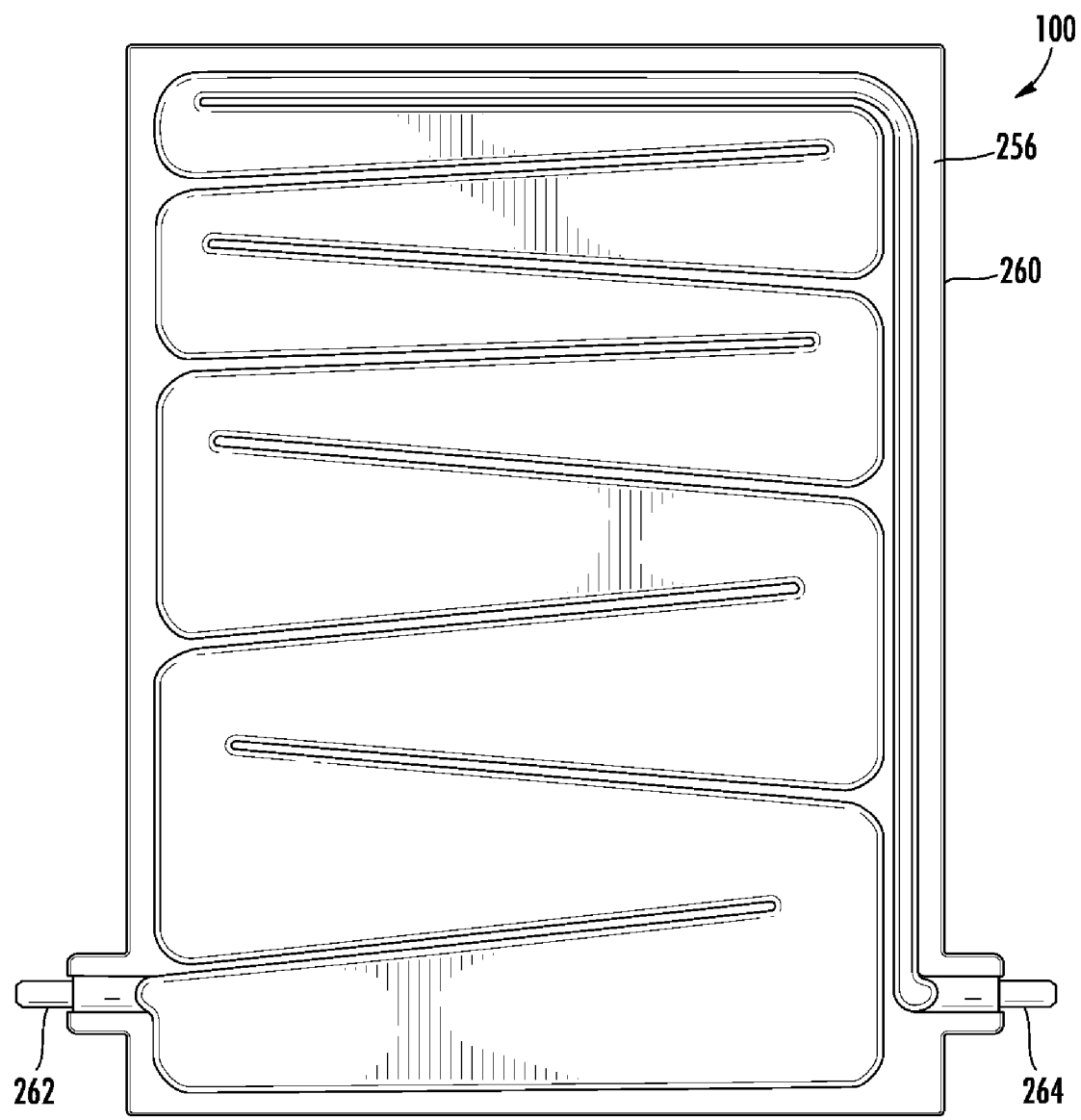
FIG. 24 is a schematic of a first side of a heat exchanger utilized in the battery cell assembly of FIG. 3.
Figure 25:
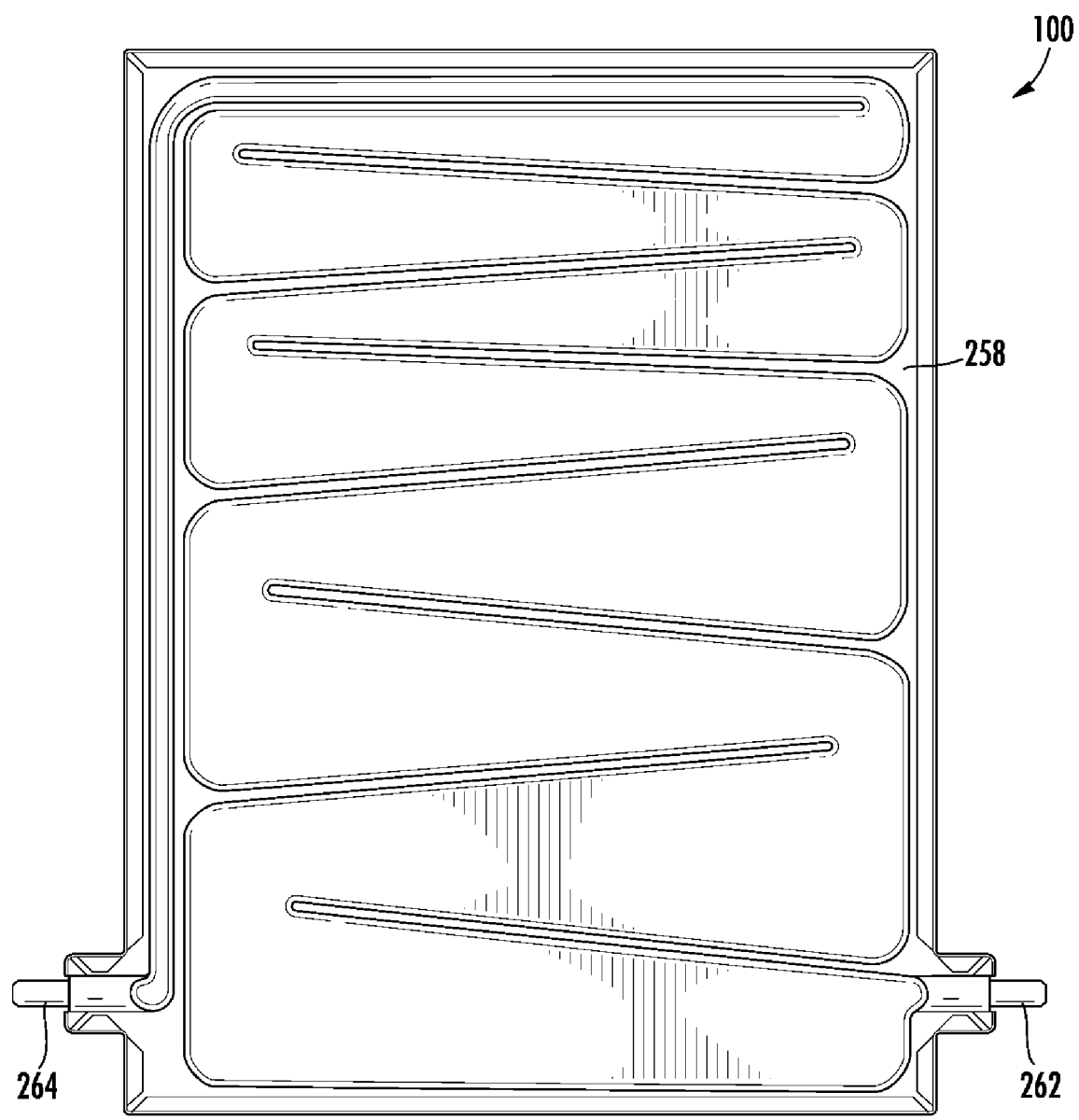
FIG. 25 is a schematic of a second side of the heat exchanger of FIG. 24.
Figure 26:
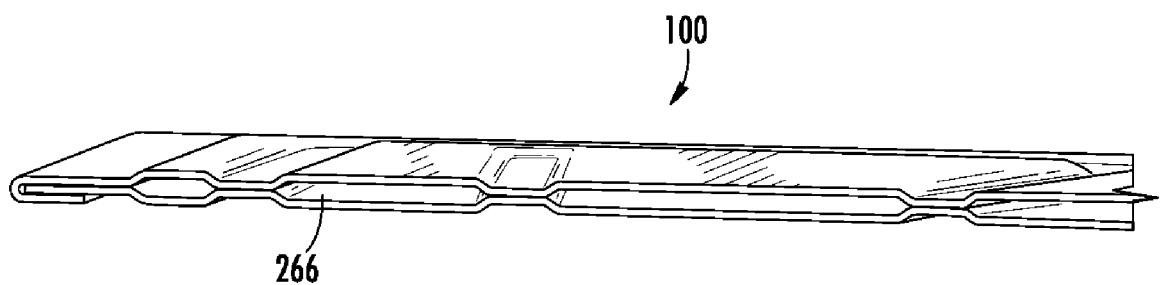
FIG. 26 is a cross-sectional schematic of the heat exchanger of FIG. 24.

Referring to FIGS. 3, 11, 12 and 13, the features of the rectangular ring-shaped frame member 90 on the side 112 will now be discussed. The lower wall 118 includes alignment-coupling features 140, 142 disposed on opposite ends of the lower wall 118. Further, the upper wall 120 includes alignment-coupling features 144, 146 disposed on opposite ends of the upper wall 120. The alignment-coupling features 140, 142, 144, 146 are configured to couple and align with alignment-coupling features 232, 230, 236, 234, respectively, on the battery cell assembly 98 shown in FIG. 18. Further, the side walls 114, 116 and lower wall 118 and upper wall 120 define a ledge portion 150 for receiving a portion of the battery cell 92 thereon. Finally, referring to FIGS. 11 and 18, the side 112 of the frame member 98 includes a side coupling identifier "B" which indicates the side 112 is to be coupled to the side 200 of the frame member 98 having the side coupling identifier "B."

Figure 3:
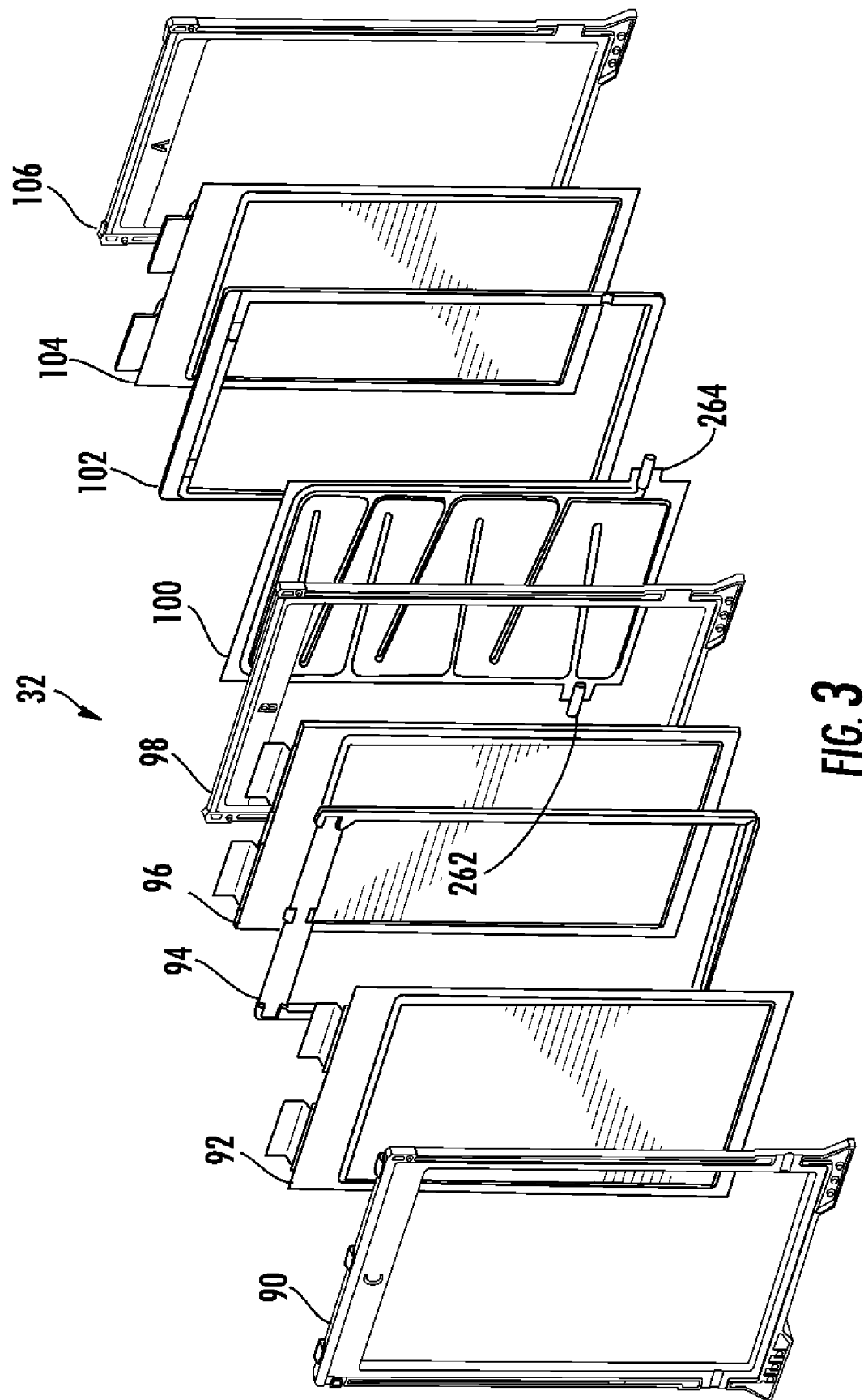
FIG. 3 is an exploded schematic of a battery cell assembly utilized in the battery module of FIG. 2.
Figure 4:
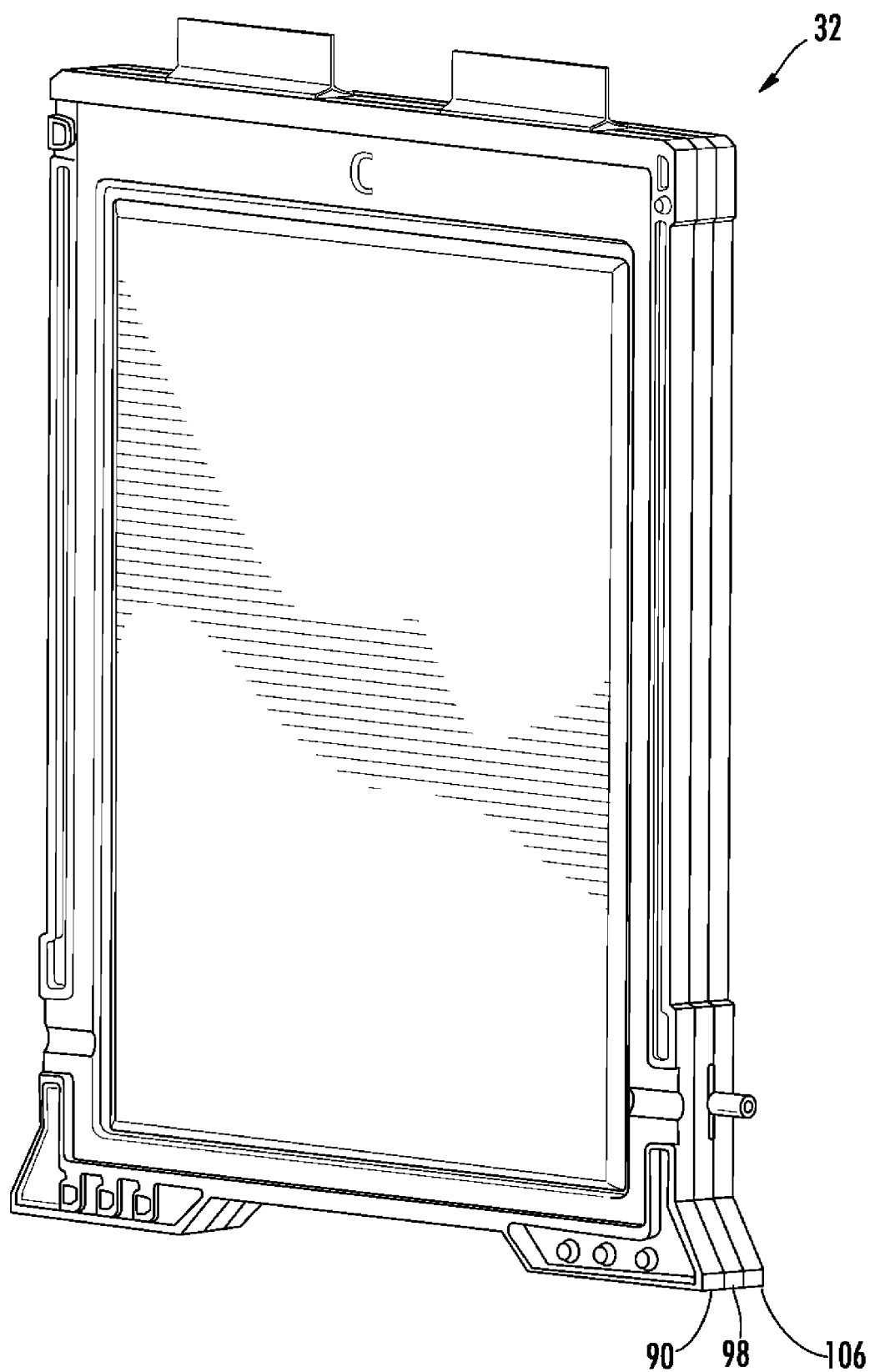
FIG. 4 is another schematic of the battery cell assembly of FIG. 3.
Figure 5:
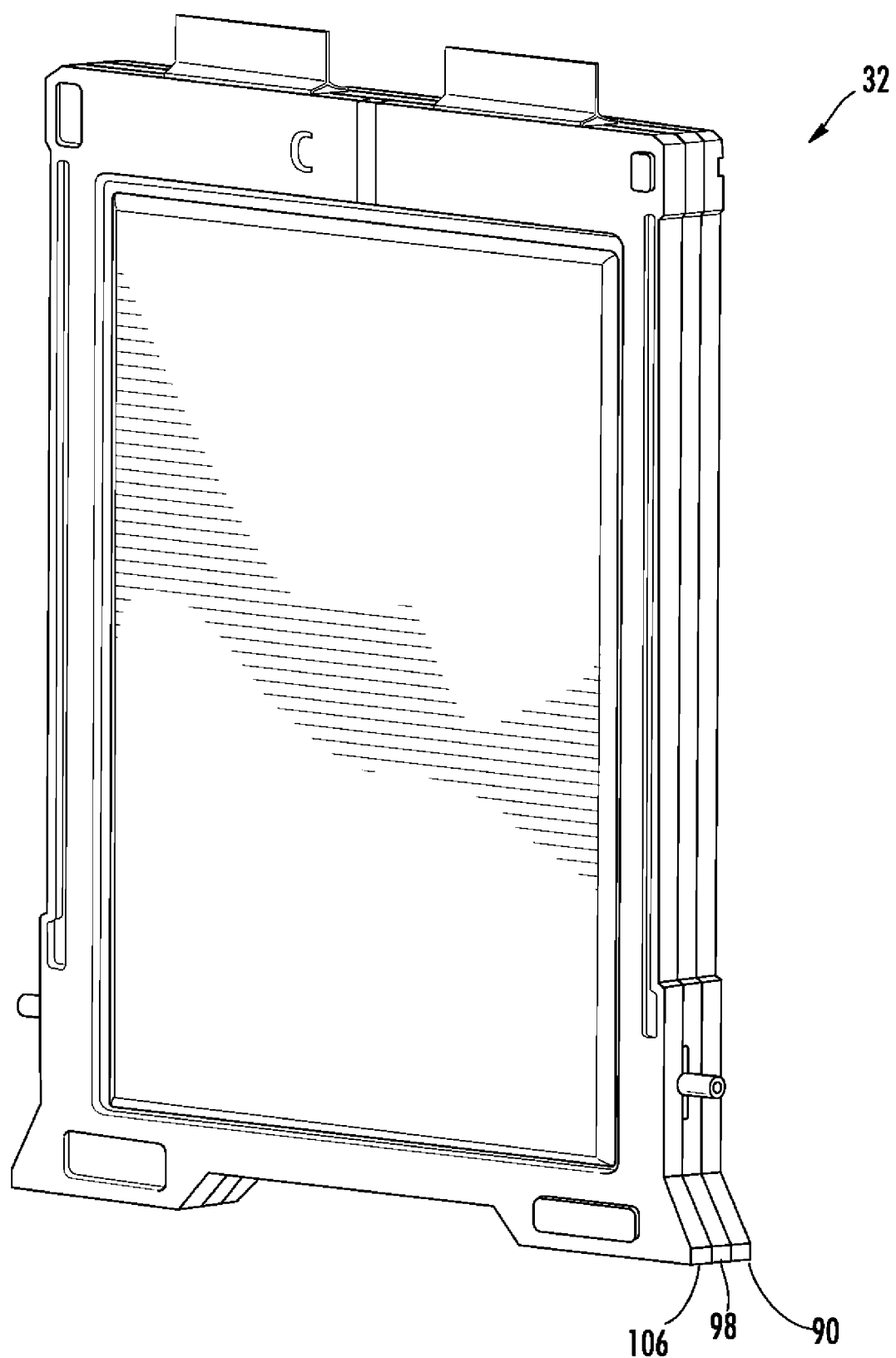
FIG. 5 is another schematic of the battery cell assembly of FIG. 3.
Figure 6:
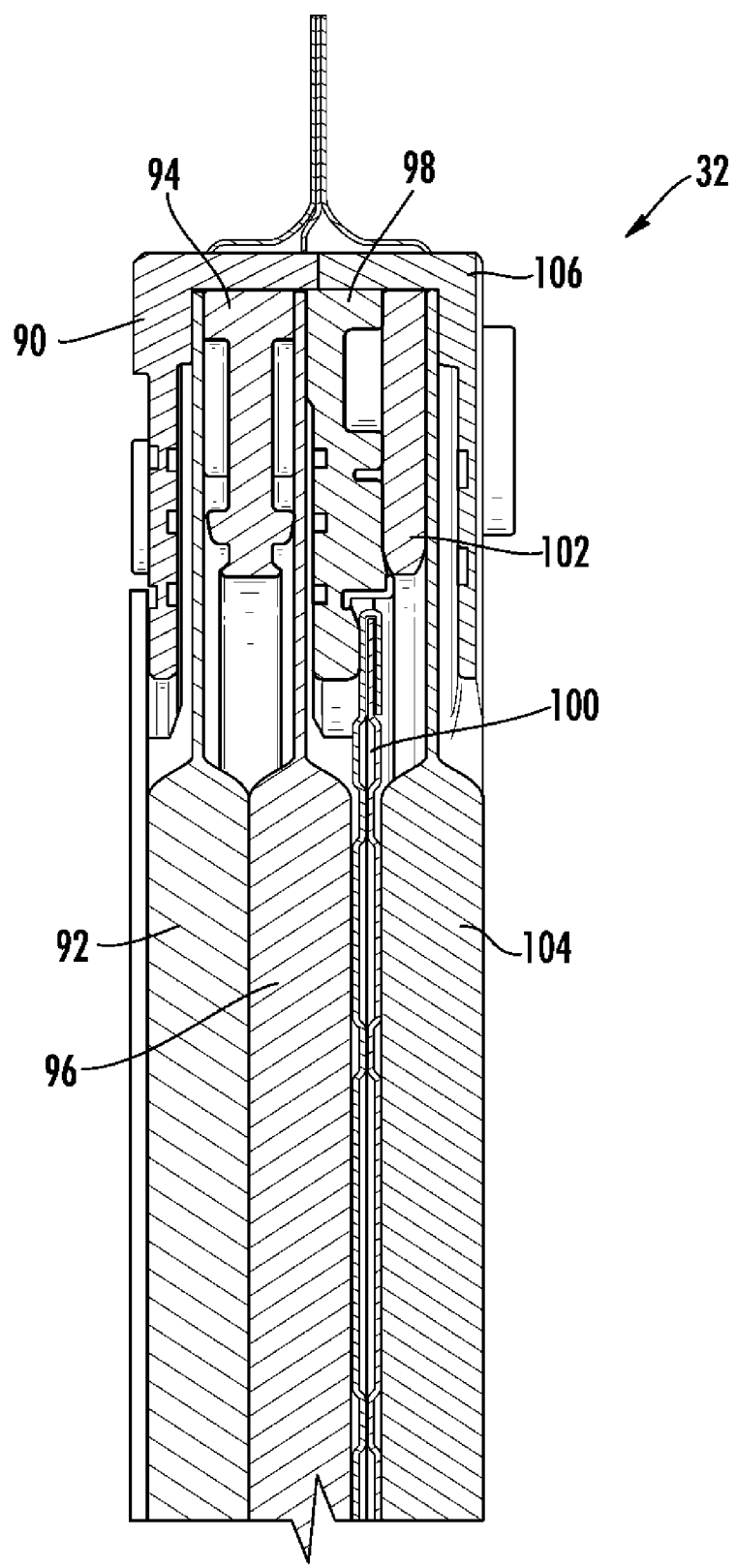
FIG. 6 is a cross-sectional schematic of a top portion of the battery cell assembly of FIG. 3.
Figure 7:
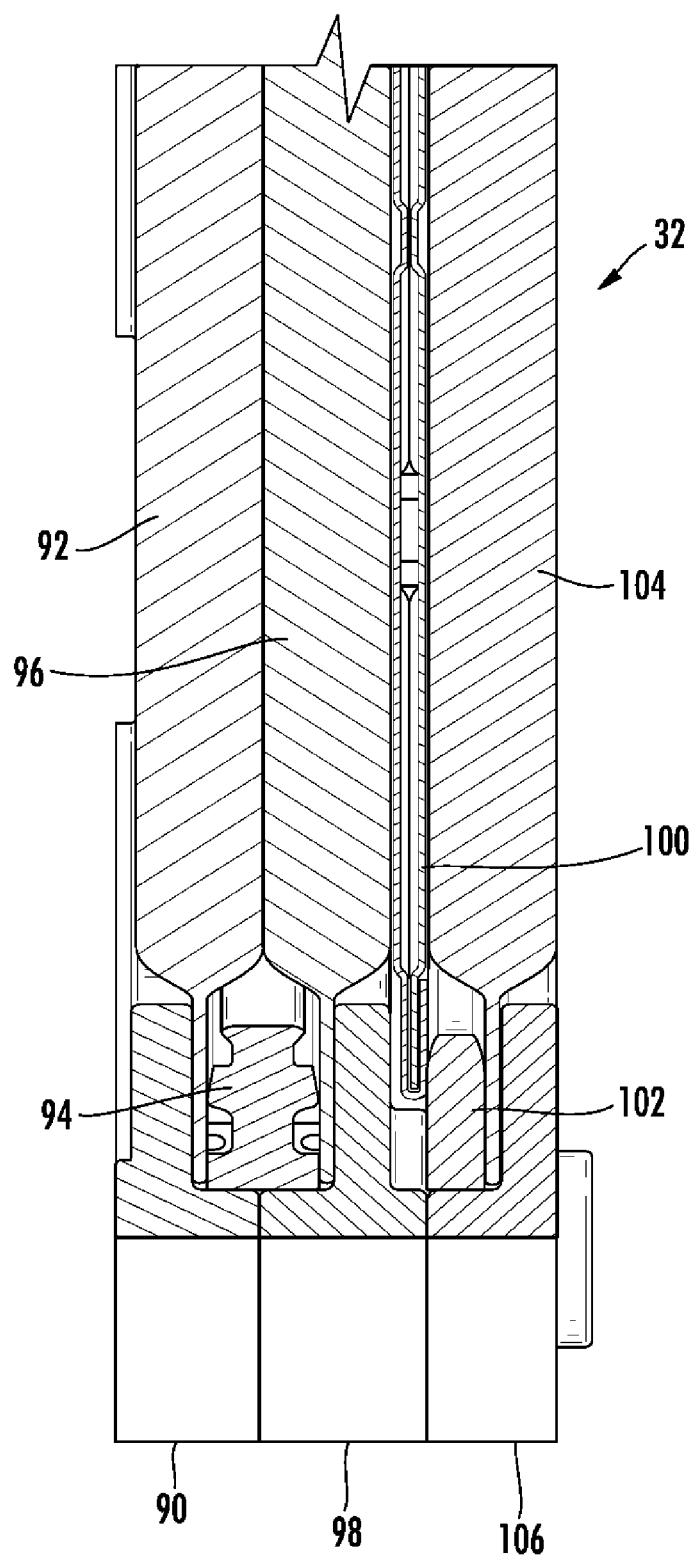
FIG. 7 is a cross-sectional schematic of a bottom portion of the battery cell assembly of FIG. 3.
Figure 8:
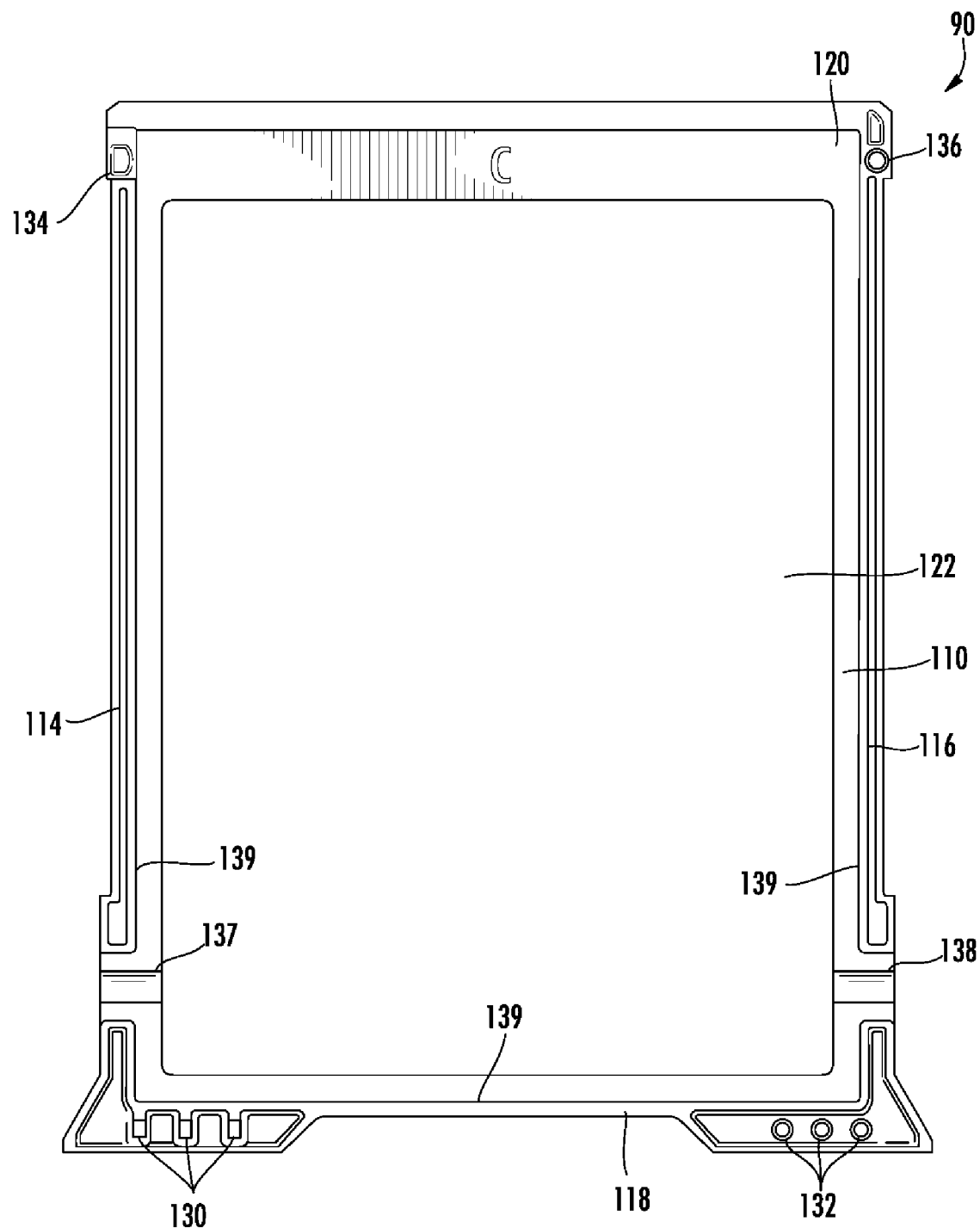
FIG. 8 is a schematic of a first side of a first rectangular ring-shaped frame member utilized in the battery cell assembly of FIG. 3.
Figure 9:
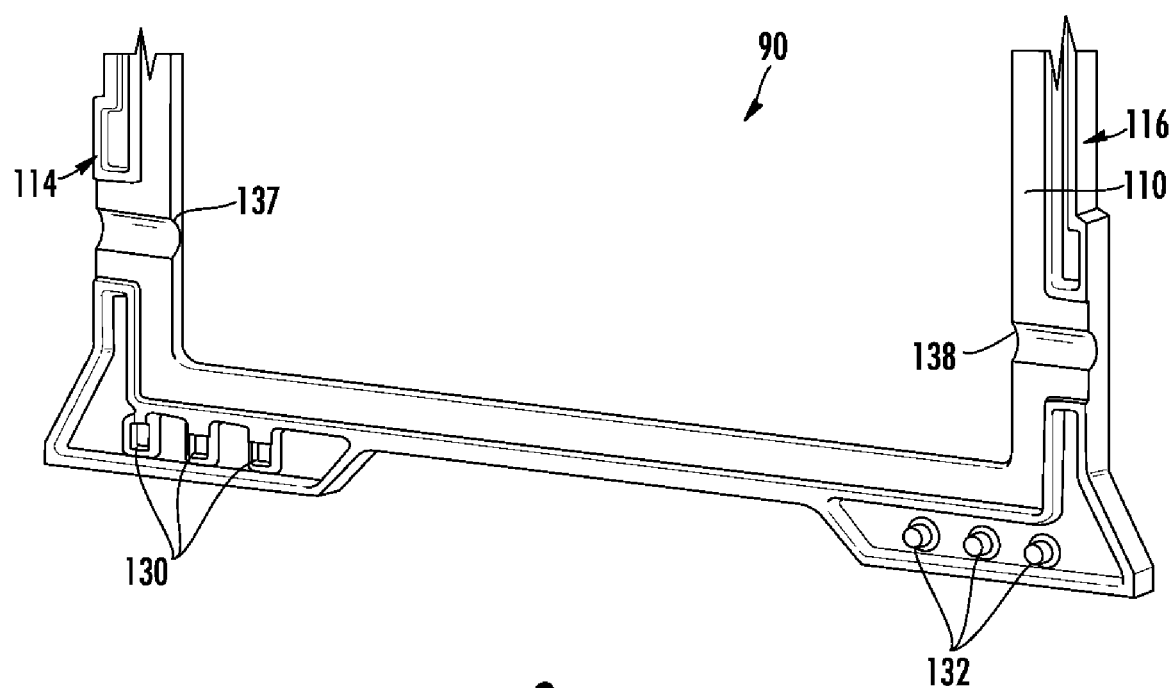
FIG. 9 is a schematic of a bottom portion of the first side of the first rectangular ring-shaped frame member of FIG. 8.
Figure 10:
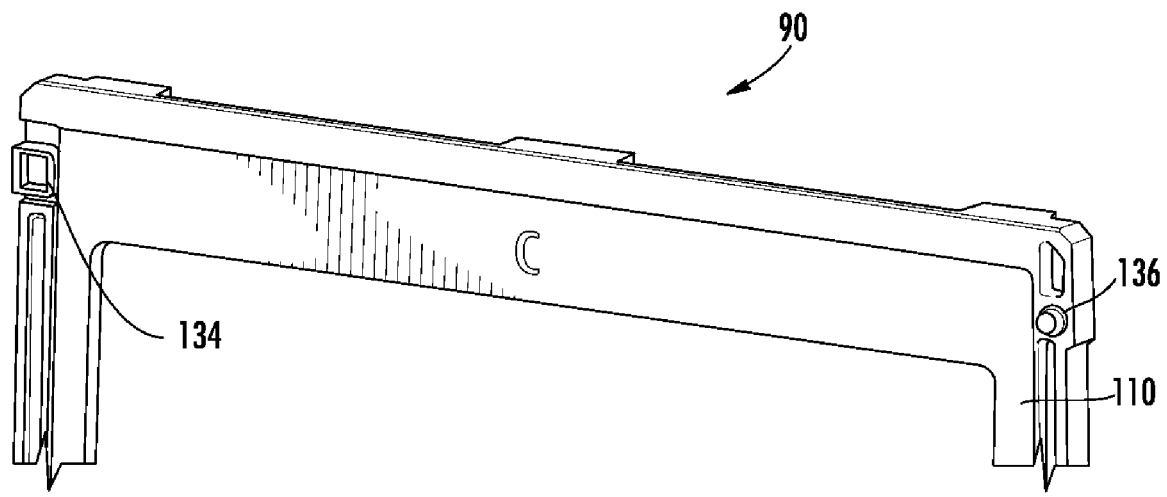
FIG. 10 is a schematic of a top portion of the first side of the first rectangular ring-shaped frame member of FIG. 8.
Figure 11:
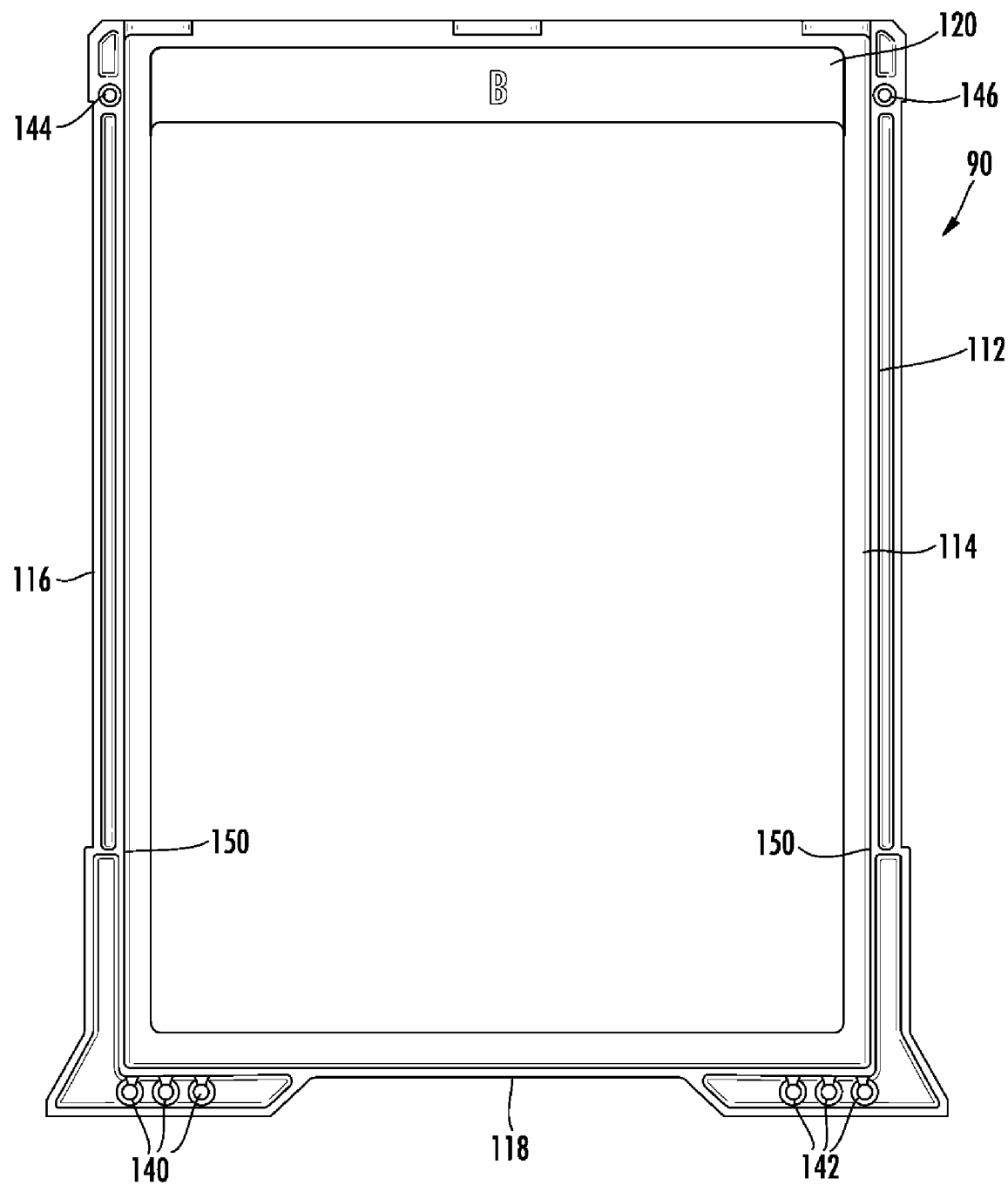
FIG. 11 is a schematic of a second side of the first rectangular ring-shaped frame member of FIG. 8.
Figure 12:
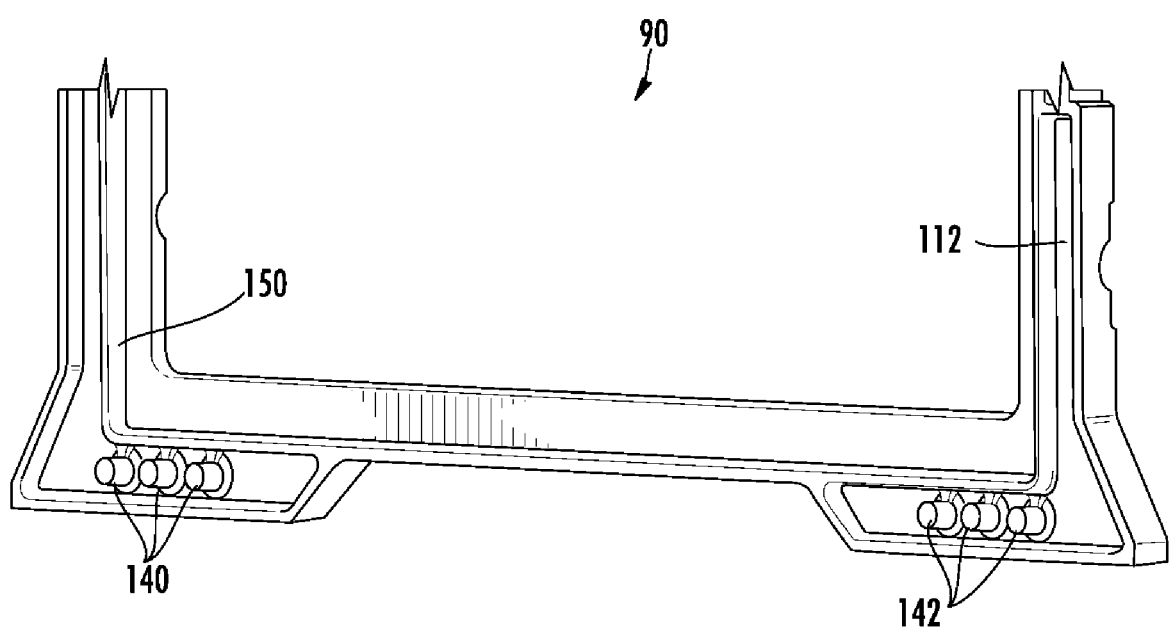
FIG. 12 is a schematic of a bottom portion of the second side of the first rectangular ring-shaped frame member of FIG. 11.
Figure 13:
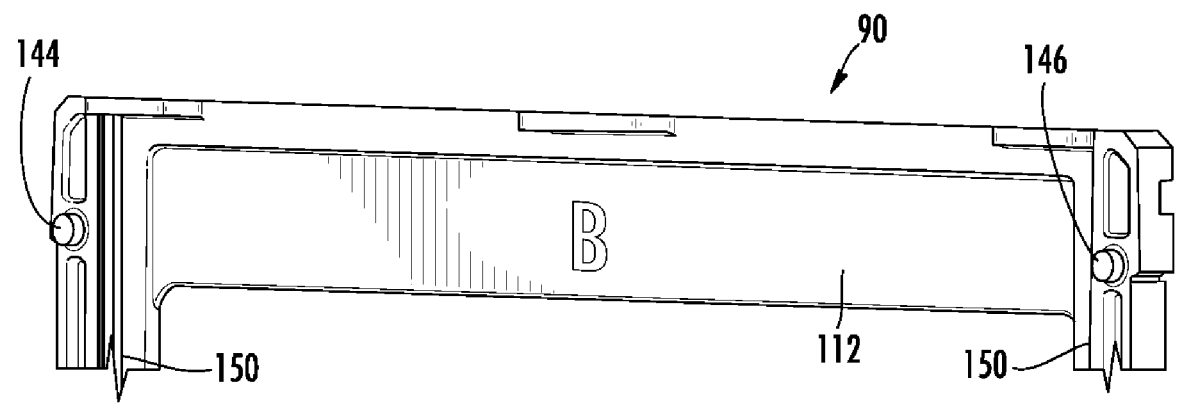
FIG. 13 is a schematic of a top portion of the second side of the first rectangular ring-shaped frame member of FIG. 11.
Figure 14:
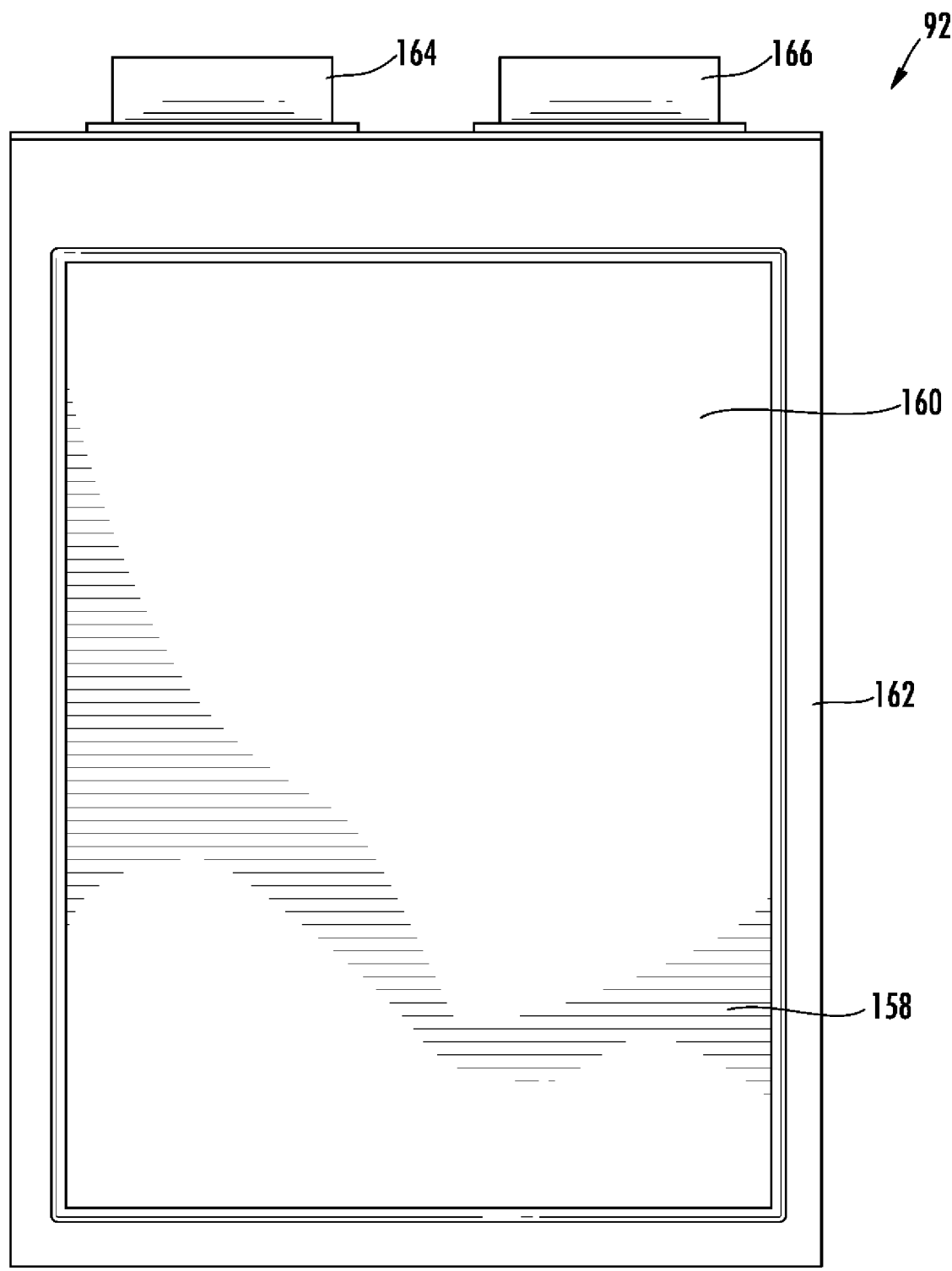
FIG. 14 is a schematic of a first side of a first battery cell utilized in the battery cell assembly of FIG. 3.
Figure 15:
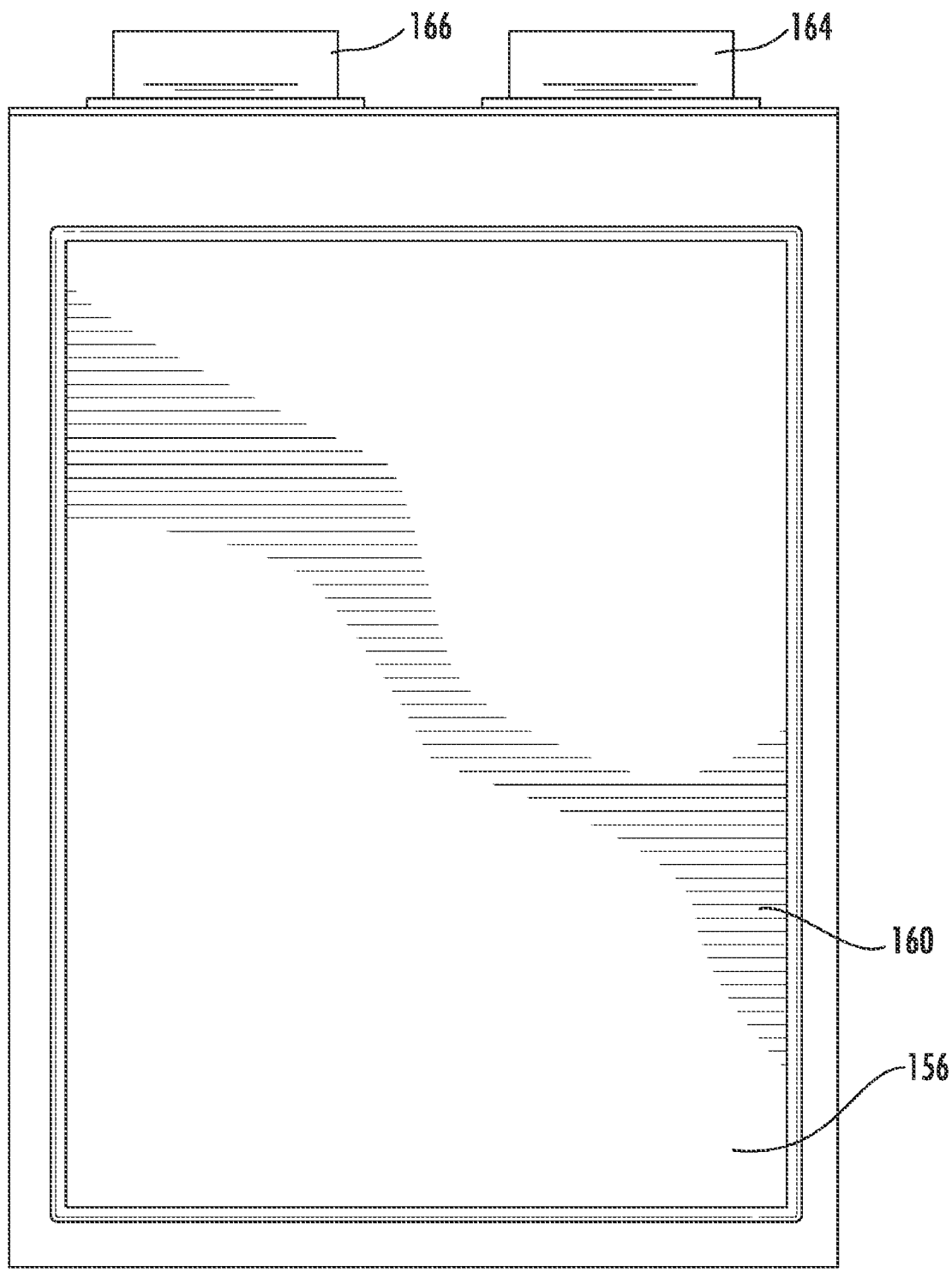
FIG. 15 is a schematic of a second side of the first battery cell of FIG. 14.

Referring to FIGS. 3, 14 and 15, the battery cell 92 is provided to output an operational voltage between the electrical terminals 164, 166. The battery cell 92 includes a body portion 160 and a peripheral lip portion 162 extending around the body portion 160, and electrical terminals 164, 166 extending from the body portion 160. The battery cell 92 is generally rectangular-shaped and includes a side 156 and a side 158 opposite the side 156. In one exemplary embodiment, the battery cell 92 is a lithium battery cell. Of course, in alternative embodiments, the battery cell 92 can comprise other types of battery cells known to those skilled in the art. The size of the peripheral lip portion 162 is smaller than a size of the rectangular ring-shaped frame member 90 such that the frame member 90 covers the peripheral lip portion 162 of the battery cell 92. Referring to FIGS. 6 and 7, the battery cell 92 is disposed between the frame member 90 and a portion of the securement ring-shaped member 94 and the battery cell 96.

Figure 16:
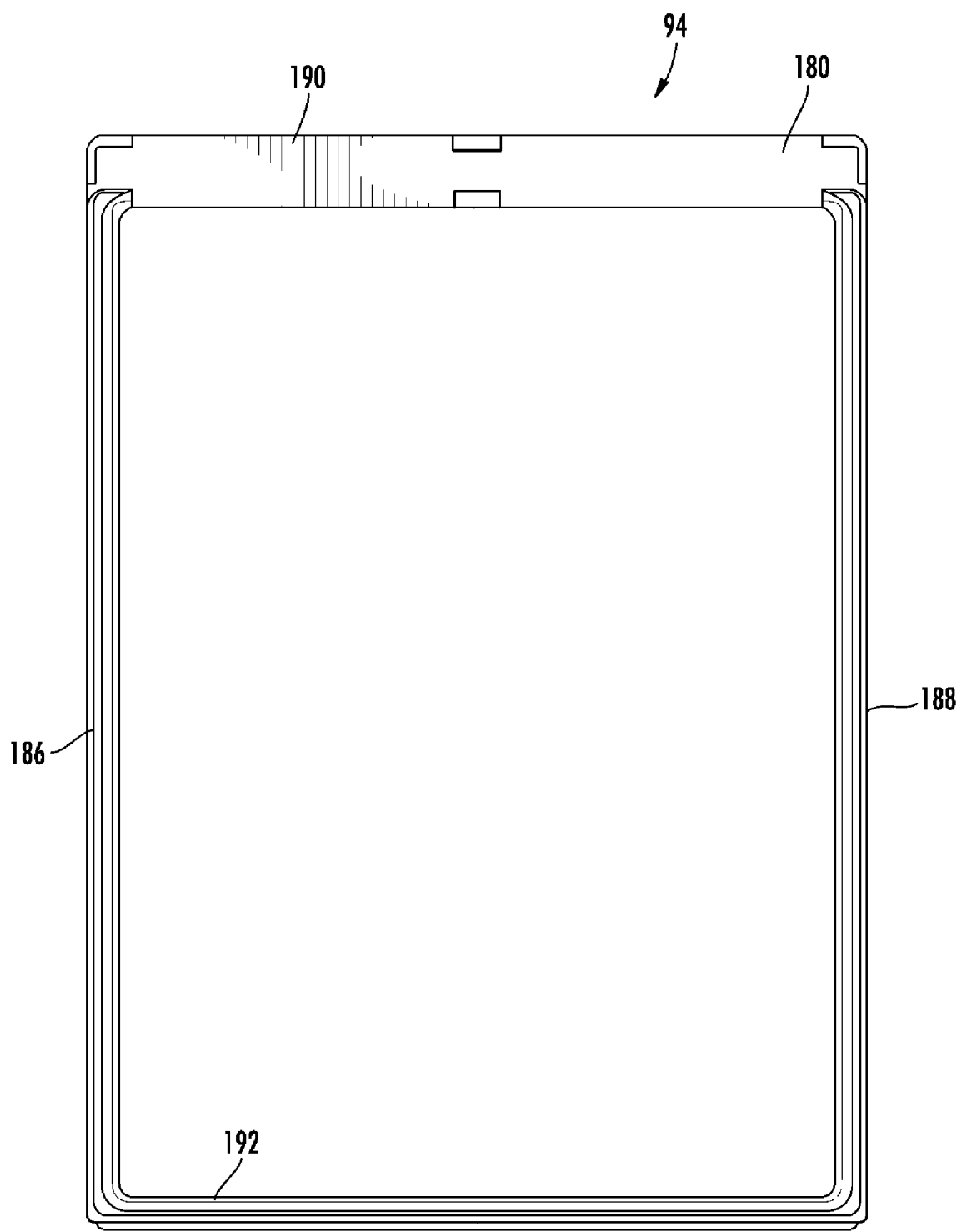
FIG. 16 is a schematic of a first side of a first securement ring-shaped member utilized in the battery cell assembly of FIG. 3.
Figure 17:
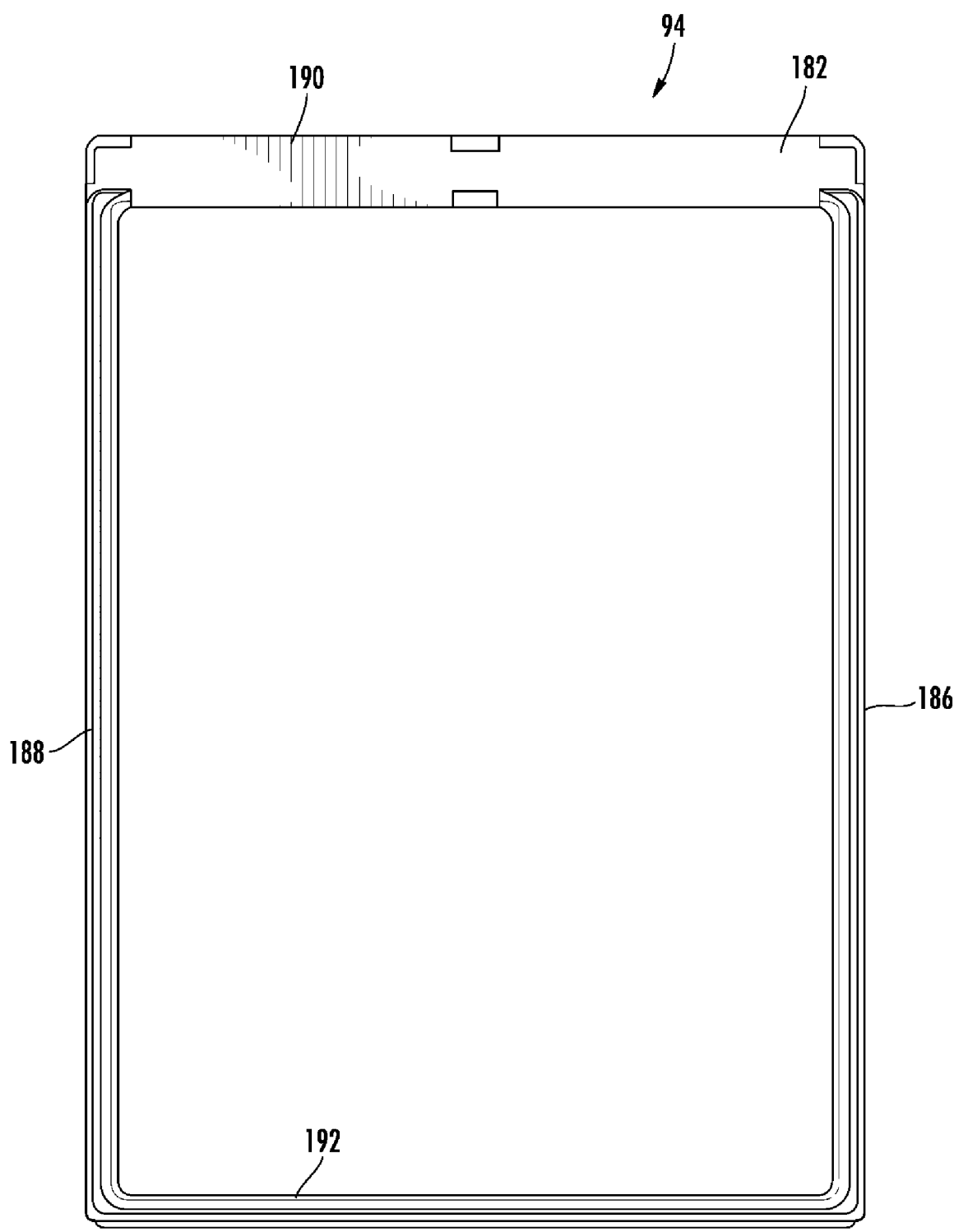
FIG. 17 is a schematic of a second side of the first securement ring-shaped member of FIG. 16.

Referring to FIGS. 3, 16 and 17, the securement ring-shaped member 94 is provided to further secure the battery cells 92, 96 between the rectangular ring-shaped members 90, 98. The securement ring-shaped member 94 includes a side 180 and an opposite side 182. Further, the securement ring-shaped member 94 includes side walls 186, 188 disposed away from one another and substantially parallel to one another. Further, the securement ring-shaped member 94 includes an upper wall 190 and a lower wall 192 extending between the side walls 186, 188. The side walls 186, 188, the upper wall 190 and the lower wall 192 define an open region 193 therebetween. An outer peripheral size of the securement ring-shaped member 94 is smaller than an outer peripheral size of the rectangular ring-shaped frame member 90 and smaller than an outer peripheral size of the rectangular ring-shaped frame member 98. Referring to FIGS. 6 and 7, the securement ring-shaped member 94 is disposed between the peripheral lip portions of the battery cells 92, 96 to further support the battery cells 92, 96.

Referring to FIGS. 3 and 6, the battery cell 96 is disposed between the rectangular ring-shaped frame member 98 and both a portion of the battery cell 92 and the securement ring-shaped member 94. The structure of the battery cell 96 is substantially similar to the battery cell 92.

Referring to FIGS. 3, 18, 19, 20 and 21, the rectangular ring-shaped frame member 98 is configured to be coupled to the rectangular ring-shaped frame member 90 for holding the battery cell 92, the securement ring-shaped member 94, and the battery cell 96 therebetween. Further, the rectangular ring-shaped frame member 98 is provided to couple to the rectangular ring-shaped frame member 106 for holding the heat exchanger 100, the securement ring-shaped member 102, and the battery cell 104 therebetween. The rectangular ring-shaped frame member 98 includes a side 200 and an opposite side 202. Further, in an exemplary embodiment, the frame member 98 includes side walls 214, 216, a lower wall 218, and an upper wall 220. The side walls 214, 216 are disposed apart from one another and are substantially parallel to one another. The lower wall 218 extends between the side walls 214, 216. Further, the upper wall 220 extends between the side walls 214, 216. The side walls 214, 216, the lower wall 218, and the upper wall 220 define an open region 222 therebetween.

Referring to FIGS. 3, 18, 19 and 20, the features of the rectangular ring-shaped frame member 98 on the side 200 will now be discussed. The lower wall 218 includes alignment-coupling features 230, 232 disposed on opposite ends of the lower wall 218. Further, the upper wall 220 includes alignment-coupling features 234, 236 disposed on opposite ends of the upper wall 220. The alignment-coupling features 230, 232, 234, 236 are configured to couple and align with alignment-coupling features 142, 140, 146, 144, respectively, on the side 112 of the rectangular ring-shaped frame member 90 shown in FIG. 11. Further, the side walls 214, 216, the lower wall 218, and the upper wall 220 define a ledge portion 238. Finally, referring to FIGS. 18 and 11, the side 200 of the frame member 98 includes a side coupling identifier "B" which indicates the side 200 is to be coupled to the side 112 of the frame member 90 having the side coupling identifier "B."

Figure 29:
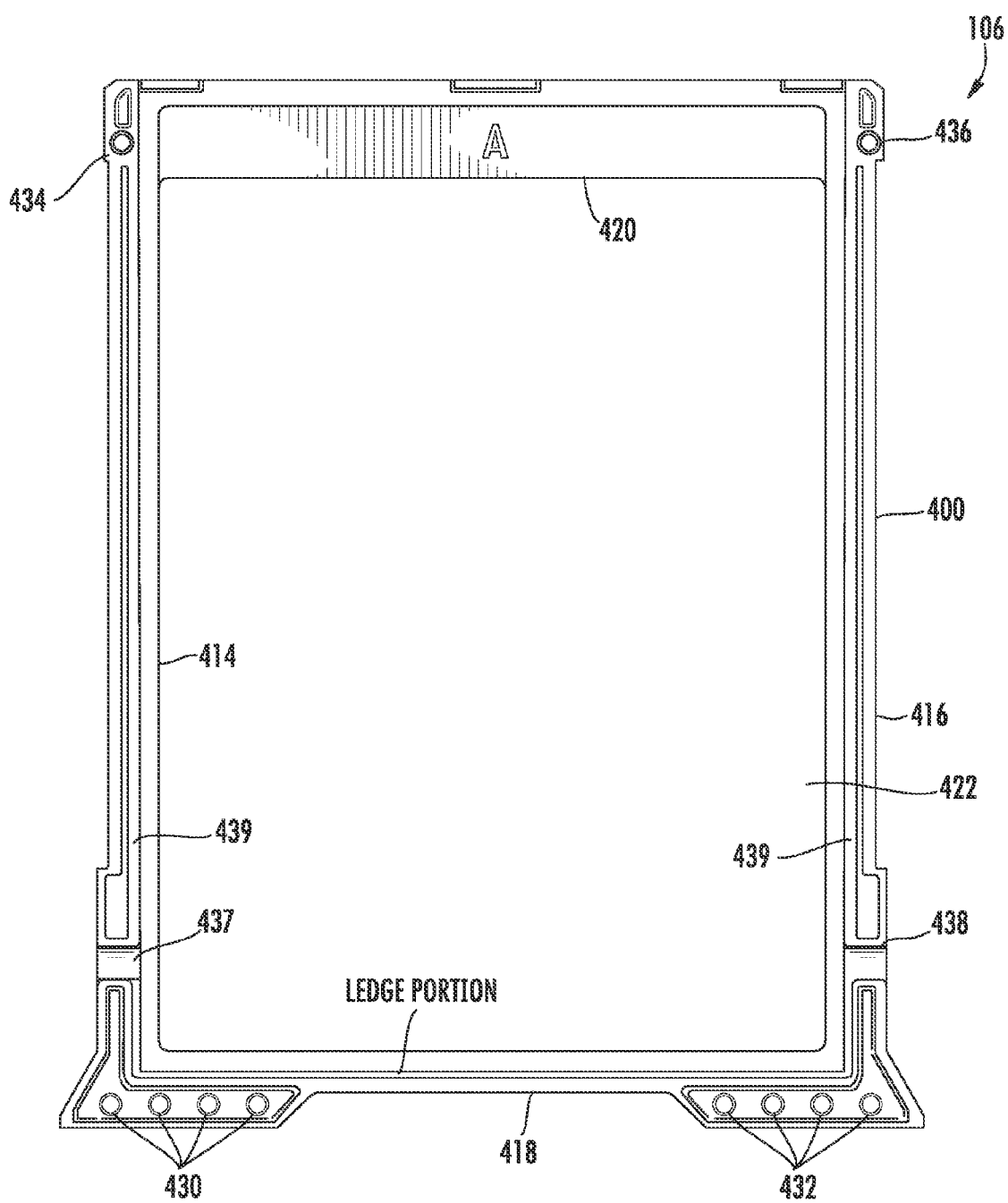
FIG. 29 is a schematic of a first side of a third rectangular ring-shaped frame member utilized in the battery cell assembly of FIG. 3.
Figure 30:
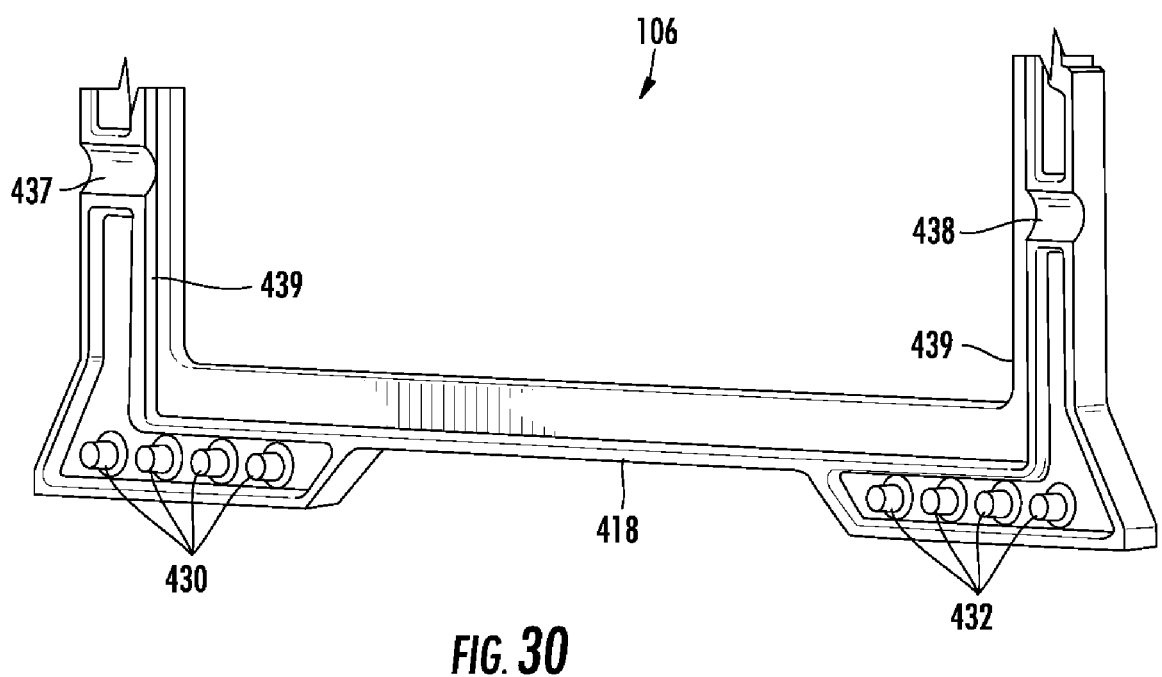
FIG. 30 is a schematic of a bottom portion of the first side of the third rectangular ring-shaped frame member of FIG. 29.
Figure 31:
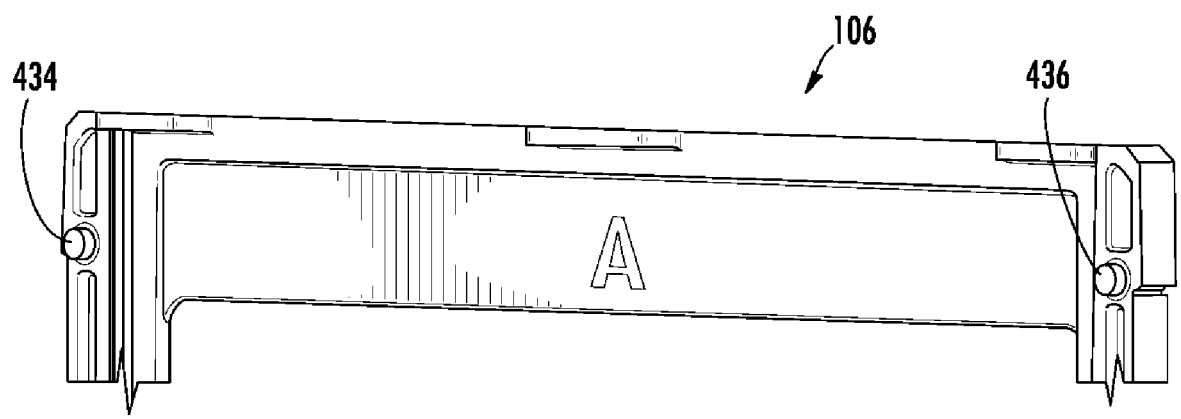
FIG. 31 is a schematic of a top portion of the first side of the third rectangular ring-shaped frame member of FIG. 29.
Figure 32:
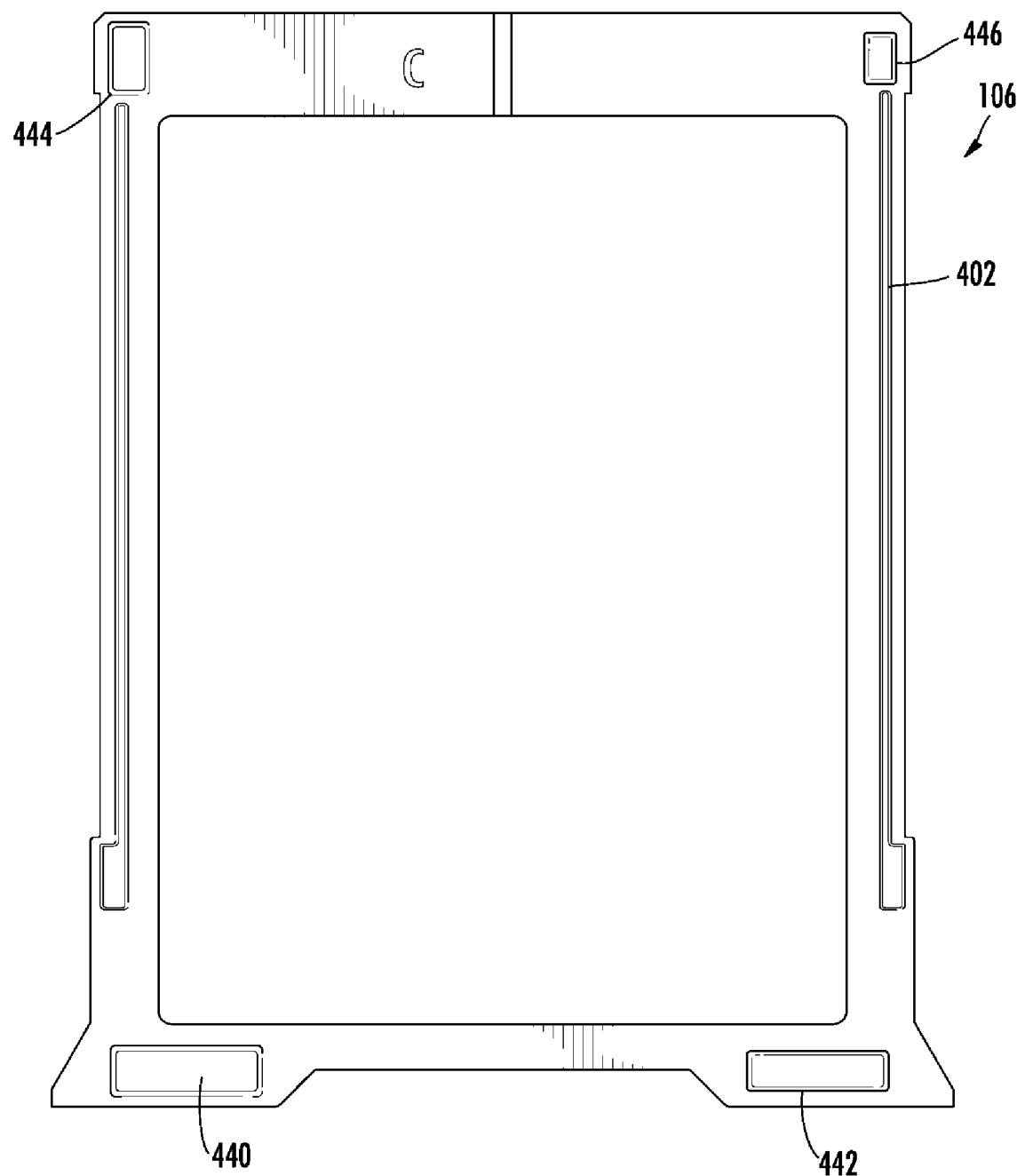
FIG. 32 is a schematic of a second side of the third rectangular ring-shaped frame member of FIG. 29.
Figure 33:
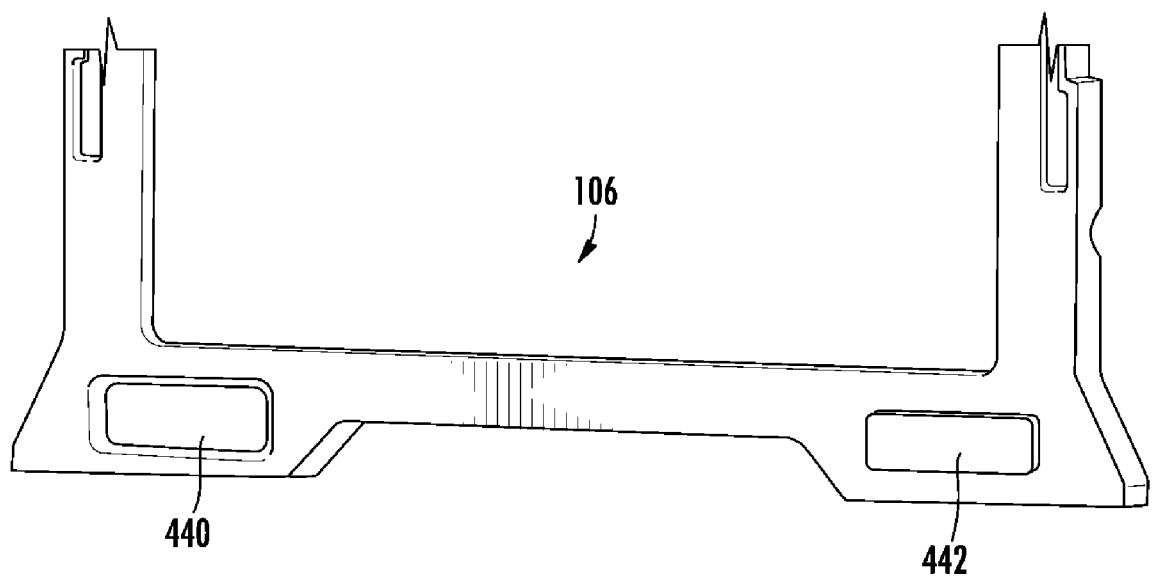
FIG. 33 is a schematic of a bottom portion of the second side of the third rectangular ring-shaped frame member of FIG. 32.
Figure 34:
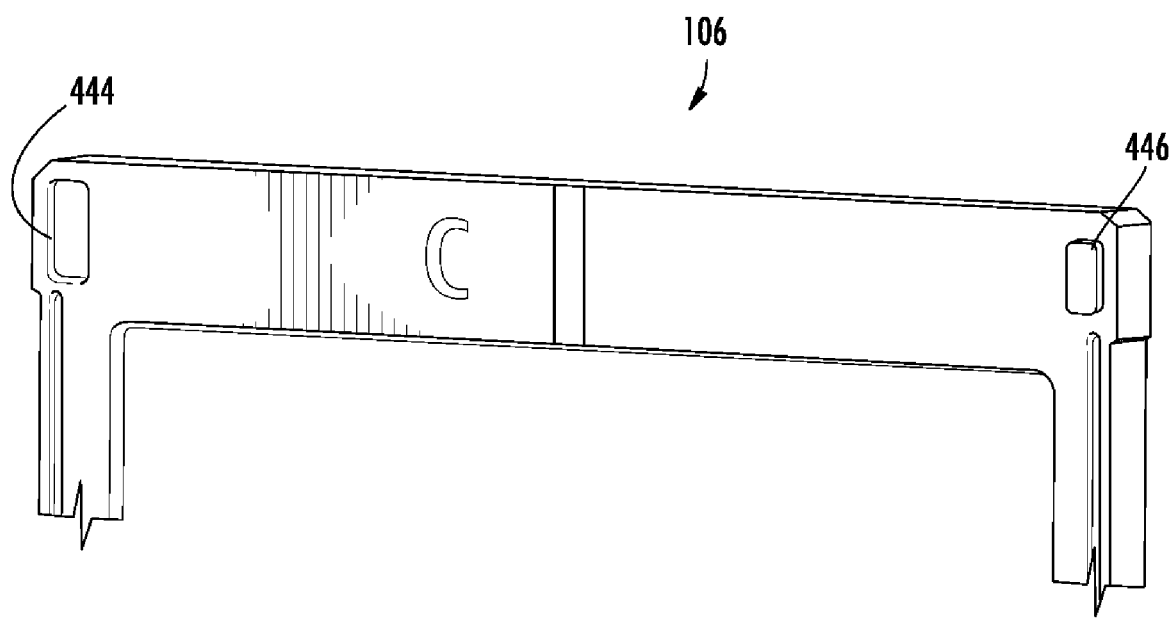
FIG. 34 is a schematic of a top portion of the second side of the third rectangular ring-shaped frame member of FIG. 21.

Referring to FIGS. 3, 21, 22 and 23, the features of the rectangular ring-shaped frame member 98 on the side 202 will now be discussed. The lower wall 218 includes alignment-coupling features 240, 242 disposed on opposite ends of the lower wall 218. Further, the upper wall 220 includes alignment-coupling features 244, 246 disposed on opposite ends of the upper wall 220. The alignment-coupling features 240, 242, 244, 246 are configured to couple and align with alignment-coupling features 432, 430, 436, 434, respectively, on the battery cell assembly 106 shown in FIG. 29. Further, the side walls 214, 216, the lower wall 218, and the upper wall 220 define a ledge portion 250 for receiving a portion of the heat exchanger 100 thereon. Further, the side walls 114, 116, have horizontal grooves 247, 248, respectively, for receiving a portion of an outlet port and an inlet port, respectively, of the heat exchanger 100 thereon. Finally, referring to FIGS. 21 and 29, the side 202 of the frame member 98 includes a side coupling identifier "A" that indicates the side 202 is to be coupled to the side 400 of the frame member 106 having the side coupling identifier "A."

Referring to FIGS. 3, 6, 7, 24 and 25, the heat exchanger 100 is configured to cool the battery cells 92, 96 and 104 to maintain the battery cells at a desired temperature. The heat exchanger 100 is disposed between (i) a portion of the battery cell 96 and the rectangular ring-shaped frame member 98, and (ii) a portion of the battery cell 104 and the securement ring-shaped member 102. The heat exchanger 100 includes a side 256 and an opposite side 258. The heat exchanger 100 further includes a housing 260, an inlet port 262, and an outlet port 264. The housing 260 defines a flow path 266 that extends from the inlet port 262 to the outlet port 264. During operation, fluid from the cooling manifold 78 flows through the inlet port 262 into the heat exchanger 100. Thereafter, the fluid flows through the flow path 266 to the outlet port 264. While flowing through the flow path 266, the fluid extracts heat energy from the battery cells 92, 96, 104 to cool the battery cells. From the outlet port 264, the heated fluid flows to the cooling manifold 80.

Figure 27:
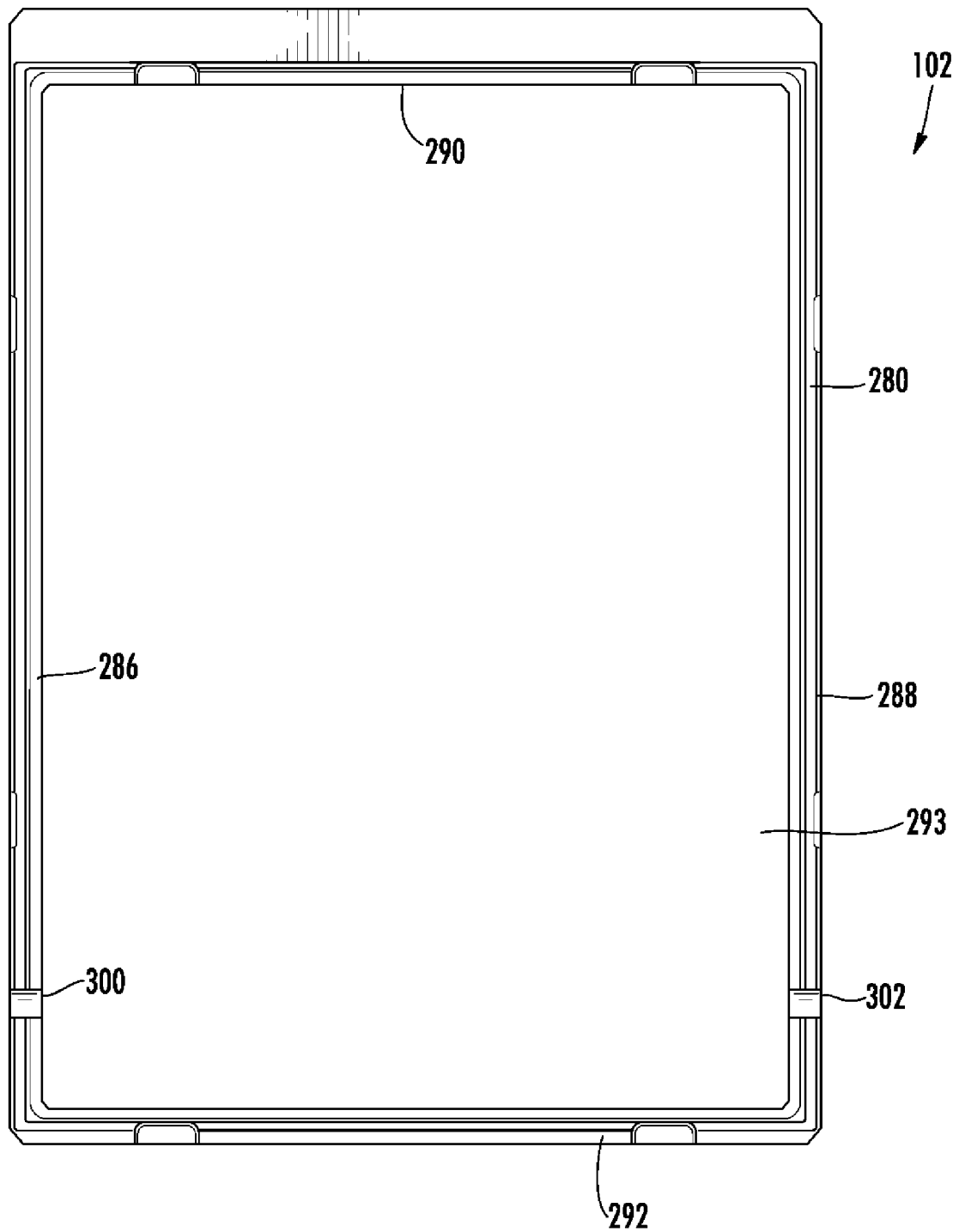
FIG. 27 is a schematic of a first side of a second securement ring-shaped member utilized in the battery cell assembly of FIG. 3.
Figure 28:
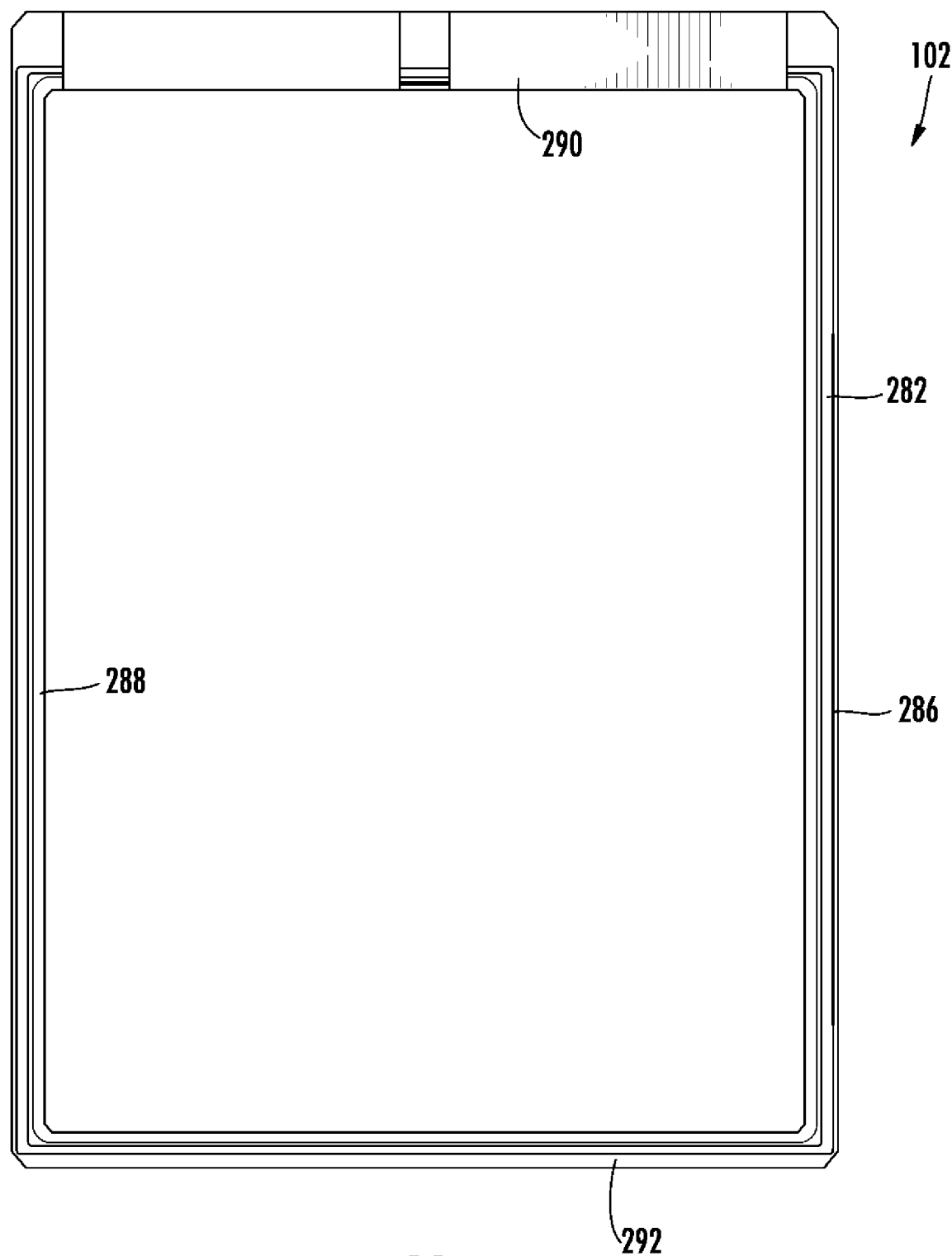
FIG. 28 is a schematic of a second side of the second securement ring-shaped member of FIG. 27.

Referring to FIGS. 3, 27 and 28, the securement ring-shaped member 102 is provided to further secure the heat exchanger 100 and the battery cell 104 between the rectangular ring-shaped members 90, 106. The securement ring-shaped member 102 includes a side 280 and an opposite side 282. Further, the securement ring-shaped member 102 includes side walls 286, 288 disposed away from one another and substantially parallel to one another. Further, the securement ring-shaped member 102 includes an upper wall 290 and a lower wall 292 extending between the side walls 286, 288. The side walls 286, 288, the upper wall 290 and the lower wall 292 define an open region 293 therebetween. The side walls 286, 288 on the side 280 include grooves 300, 302, respectively, for receiving the inlet port 262 and the outlet port 264, respectively of the heat exchanger 100 thereon. An outer peripheral size of the securement ring-shaped member 102 is smaller than an outer peripheral size of the rectangular ring-shaped frame member 98 and smaller than an outer peripheral size of the rectangular ring-shaped frame member 106. Referring to FIGS. 6 and 7, the securement ring-shaped member 102 is disposed between the rectangular ring-shaped frame member 98 and a peripheral lip portion of the battery cell 104.

Referring to FIGS. 3 and 6, the battery cell 104 is disposed between the rectangular ring-shaped frame member 106 and both a portion of the heat exchanger 100 and the securement ring-shaped member 102. The structure of the battery cell 104 is substantially similar to the battery cell 92.

Referring to FIGS. 3, 29, 30, 31 and 32, the rectangular ring-shaped frame member 106 is configured to be coupled to the rectangular ring-shaped frame member 98 for holding the heat exchanger 100, the securement ring-shaped member 102, and the battery cell 104 therebetween. Further, the rectangular ring-shaped frame member 106 is provided to couple to the battery cell assembly 34 shown in FIG. 35 as will be explained in greater detail below. The rectangular ring-shaped frame member 106 includes a side 400 and an opposite side 402. Further, in an exemplary embodiment, the frame member 106 includes side walls 414, 416, a lower wall 418, and an upper wall 420. The side walls 414, 416 are disposed apart from one another and are substantially parallel to one another. The lower wall 418 extends between the side walls 414, 416. Further, the upper wall 420 extends between the side walls 414, 416. The side walls 414, 416, the lower wall 418, and the upper wall 420 define an open region 422 therebetween. Further, the side walls 414, 416, the lower wall 418, and the upper wall 420 define a ledge portion.

Referring to FIGS. 3, 29, 30 and 31, the features of the rectangular ring-shaped frame member 106 on the side 400 will now be discussed. The lower wall 418 includes alignment-coupling features 430, 432 disposed on opposite ends of the lower wall 418. Further, the upper wall 420 includes alignment-coupling features 434, 436 disposed on opposite ends of the upper wall 420. The alignment-coupling features 430, 432, 434, 436 are configured to couple and align with alignment-coupling features 242, 240, 246, 244, respectively, on the side 202 of the rectangular ring-shaped frame member 98 shown in FIG. 21. Further, the side walls 414, 416, the lower wall 418, and the upper wall 420 define a ledge portion 439. Finally, referring to FIGS. 21 and 29, the side 400 of the frame member 106 includes a side coupling identifier "A" that indicates the side 400 is to be coupled to the side 202 of the frame member 98 having the side coupling identifier "A."

Referring to FIGS. 3, 32, 33 and 34, the features of the rectangular ring-shaped frame member 106 on the side 402 will now be discussed. The lower wall 418 includes alignment-coupling features 440, 442 disposed on opposite ends of the lower wall 418. Further, the upper wall 420 includes alignment-coupling features 444, 446 disposed on opposite ends of the upper wall 420. The alignment-coupling features 440, 442, 444, 446 are configured to couple and align with alignment-coupling features 532, 530, 536, 534, respectively, on the battery cell assembly 34 shown in FIG. 34. Finally, referring to FIGS. 32 and 35, the side 402 of the frame member 106 includes a side coupling identifier "C" which indicates the side 402 is to be coupled to a side of the frame member 450 having the side coupling identifier "C."

Referring to FIG. 3, it should be noted that the alignment-coupling features on each of the rectangular ring-shaped frame members 90, 98, 106 have a different configuration from one another such that only a specific side of each of the rectangular ring-shaped members 90, 98, 106 can align and couple with another specific side of one of the other rectangular ring-shaped frame members 90, 98, 106.

Figure 35:
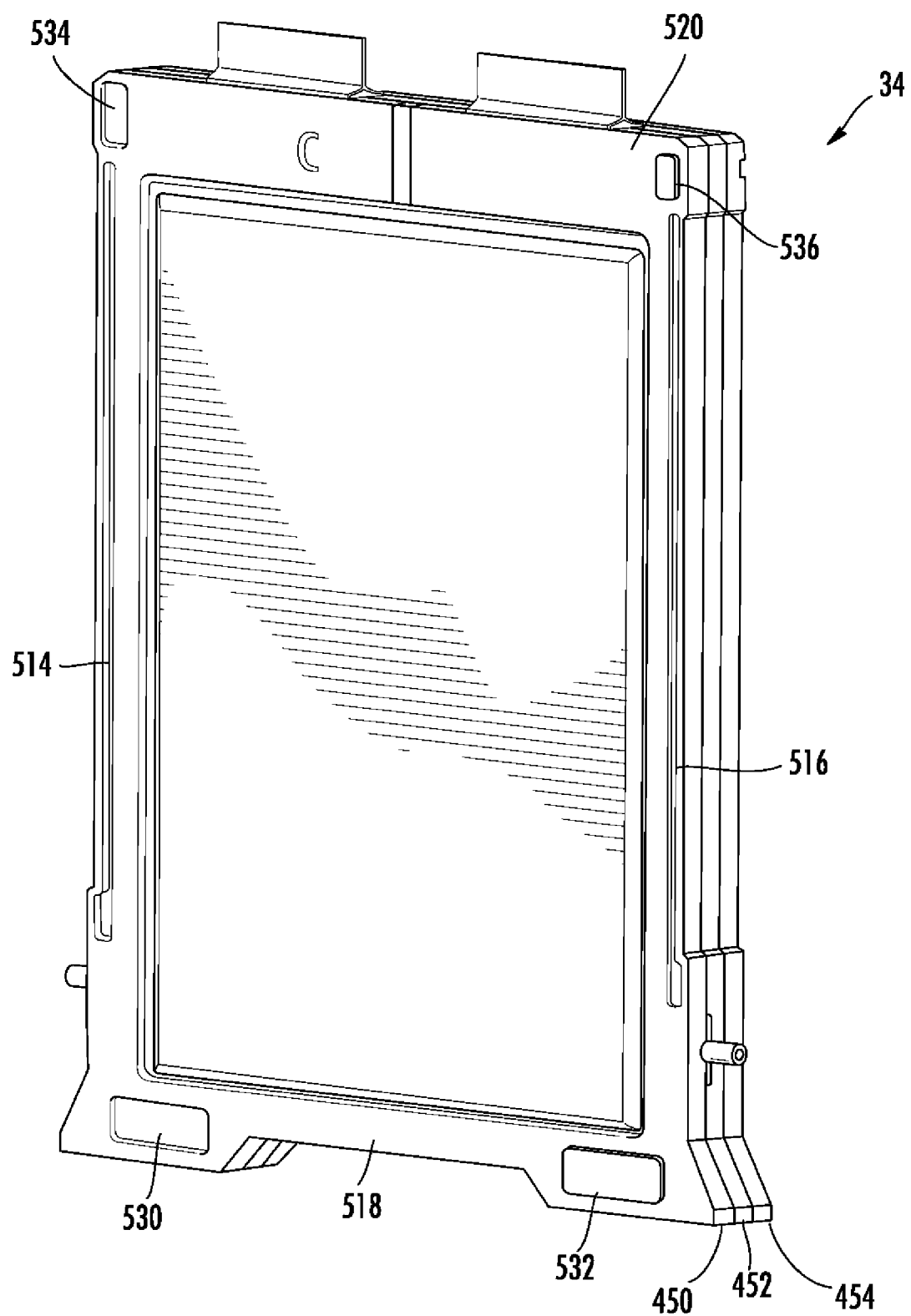
FIG. 35 is a schematic of another battery cell assembly utilized in the battery module of FIG. 2.

Referring to FIGS. 2 and 35, the battery cell assembly 34 is configured to be coupled to the battery cell assembly 32 in the battery module 20. The battery cell assembly 34 includes rectangular ring-shaped frame members 450, 452, 454. Further, the battery cell assembly 34 includes two battery cells, two securement frame members and an heat exchanger contained within the frame members 450, 452, 454. The rectangular ring-shaped frame member 450 includes side walls 514, 516, a lower wall 518, and an upper wall 520. The side walls 514, 516 are disposed apart from one another and are substantially parallel to one another. The lower wall 518 extends between the side walls 514, 516. Further, the upper wall 520 extends between the side walls 514, 516. The side walls 514, 516, the lower wall 518, and the upper wall 520 define an open region therebetween. The lower wall 518 includes alignment-coupling features 530, 532 disposed on opposite ends of the lower wall 518. Further, the upper wall 520 includes alignment-coupling features 534, 536 disposed on opposite ends of the upper wall 520. The alignment-coupling features 530, 532, 534, 536 are configured to couple and align with alignment-coupling features 442, 440, 446, 444, respectively, on the side 402 of the rectangular ring-shaped frame member 106 shown in FIG. 32.

Figure 36:
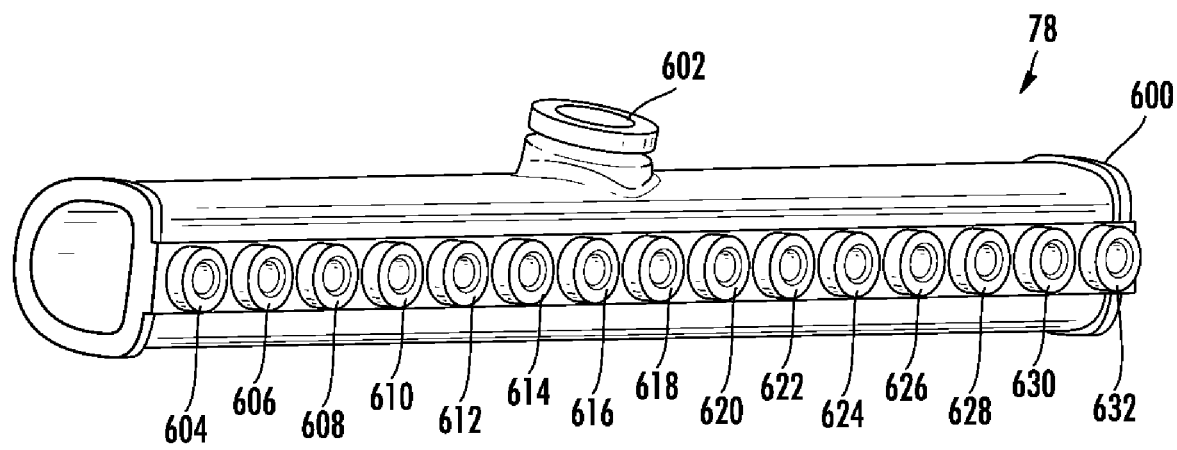
FIG. 36 is a schematic of a cooling manifold utilized in the battery module of FIG. 1.

Referring to FIGS. 1 and 36, the cooling manifold 78 will be explained in further detail. In particular, the cooling manifold 78 is configured to route a fluid to inlet ports on the heat exchangers 50, 52, 54, 56 and to the heat exchangers in the battery cell assemblies 30, 32, 34, 36, 40, 42, 44. The cooling manifold 78 includes a tubular member 600, an inlet port 602, and outlet ports 604, 606, 608, 610, 612, 614, 616, 618, 620, 622, 624, 626, 628, 630, 632. The inlet port 602 is provided to receive fluid from a fluid reservoir into the tubular member 600. The tubular member 600 routes the fluid through the outlet ports 604, 606, 608, 610, 612, 614, 616, 618, 620, 622, 624, 626, 628, 630, 632 to the respective inlet ports of the heat exchangers in the battery module 20. The cooling manifold 78 can be constructed from rubber or a rubber compound. Of course, in an alternative embodiment, the cooling manifold 78 can be constructed from other materials such as plastics, metals, or ceramics. The cooling manifold 80 has a substantially similar construction as the cooling manifold 78. The cooling manifold 80 is configured to receive heated fluid from outlet ports of the heat exchangers in the battery module 20 and to route the heated fluid to a fluid reservoir.

The battery module 20 has battery cell assemblies that provide a substantial advantage over other battery modules. In particular, the battery cell assemblies have alignment-coupling features providing a technical effect of allowing frame members of the battery cell assemblies to be easily coupled together while preventing incorrect alignment and placement of the frame members relative to one another.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:

1. A battery module, comprising:
a first battery cell assembly having at least first, second, third and fourth alignment-coupling features thereon; and
a second battery cell assembly having at least fifth, sixth, seventh, and eighth alignment-coupling features thereon, the fifth, sixth, seventh, and eighth alignment-coupling features of the second battery cell assembly configured to engage the first, second, third and fourth alignment-coupling features, respectively, of the first battery cell assembly to couple the second battery cell assembly to the first battery cell assembly and to align the second battery cell assembly relative to the first battery cell assembly, wherein the first battery cell assembly comprises:
a first rectangular ring-shaped frame member having a first side and a second side, the second side of the first rectangular ring-shaped frame member having at least ninth tenth eleventh and twelfth and twelfth alignment-coupling features thereon;
a first battery cell having a first side and a second side, the second side of the first battery cell contacting at least a portion of the second side of the first rectangular ring-shaped frame member;
a second battery cell having a first side and a second side, the first side of the second battery cell contacting the second side of the first battery cell; and
a second rectangular ring-shaped frame member having a first side and a second side, the first side of the second rectangular ring-shaped frame member having at least thirteenth, fourteenth fifteenth and sixteenth alignment-coupling features thereon, the thirteenth, fourteenth, fifteenth and sixteenth alignment-coupling features of the second rectangular ring-shaped frame member configured to engage the ninth, tenth, eleventh, and twelfth alignment-coupling features, respectively, of the first rectangular ring-shaped frame member to couple the second rectangular ring-shaped frame member to the first rectangular ring-shaped frame member to align the second rectangular ring-shaped frame member relative to first rectangular ring-shaped frame member.

2. The battery module of claim 1, wherein each of the first, second, third and fourth alignment-coupling features of the first battery cell assembly have different shapes from the other alignment-coupling features of the first battery cell assembly.

3. The battery cell assembly of claim 1, wherein each of the ninth, tenth, eleventh, and twelfth alignment-coupling features on the second side of the first rectangular ring-shaped frame member have different shapes from the other alignment-coupling features on the second side of the first battery cell assembly.

4. The battery cell assembly of claim 1, wherein the first side of the first rectangular ring-shaped frame member has the first, second, third and fourth alignment-coupling features thereon, each of the first, second, third and fourth alignment-coupling features having different shapes as compared to each of the ninth, tenth, eleventh, and twelfth alignment-coupling features on the second side of the first rectangular ring-shaped frame.

5. The battery cell assembly of claim 1, wherein the second side of the second rectangular ring-shaped frame member has seventeenth, eighteenth, nineteenth, and twentieth alignment-coupling features thereon.

6. The battery cell assembly of claim 5, further comprising:
a heat exchanger having a first side and a second side, the first side of the heat exchanger contacting both the second side of the second battery cell and the second side of the second rectangular ring-shaped frame member;
a third battery cell having a first side and a second side, the first side of the third battery cell contacting the second side of the heat exchanger, the heat exchanger being configured to remove heat energy from the first, second, and third battery cells to maintain the first, second, and third battery cells at substantially a desired temperature; and a third rectangular ring-shaped frame member having a first side and a second side, the first side of the third rectangular ring-shaped frame member having at least twenty-first, twenty-second, twenty-third, and twenty-fourth alignment-coupling features thereon, the twenty-first, twenty-second, twenty-third, and twenty-fourth alignment-coupling features of the third rectangular ring-shaped frame member configured to engage the seventeenth, eighteenth, nineteenth, and twentieth alignment-coupling features, respectively, of the second rectangular ring-shaped frame member to couple the third rectangular ring-shaped frame member to the second rectangular ring-shaped frame member and to align the third rectangular ring-shaped frame member relative to second rectangular ring-shaped frame member.

* * * * *